(12) United States Patent
Yamawaki et al.

(10) Patent No.: US 12,077,687 B2
(45) Date of Patent: Sep. 3, 2024

(54) HOT-MELT ADHESIVE AND METHOD FOR PRODUCING BONDED ARTICLE

(71) Applicant: CANON KABUSHIKI KAISHA, Tokyo (JP)

(72) Inventors: Kentaro Yamawaki, Shizuoka (JP); Yuhei Terui, Shizuoka (JP); Tsutomu Shimano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/680,570

(22) Filed: Feb. 25, 2022

(65) Prior Publication Data

US 2022/0282124 A1 Sep. 8, 2022

(30) Foreign Application Priority Data

Mar. 5, 2021 (JP) ................................. 2021-035177

(51) Int. Cl.
*C09J 5/06* (2006.01)
*B32B 37/12* (2006.01)
(Continued)

(52) U.S. Cl.
CPC ............. *C09J 5/06* (2013.01); *B32B 37/1207* (2013.01); *C09J 11/08* (2013.01); *C09J 125/14* (2013.01); *B32B 2037/1215* (2013.01); *C09J 2425/00* (2013.01); *C09J 2467/00* (2013.01); *C09J 2491/00* (2013.01)

(58) Field of Classification Search
None
See application file for complete search history.

(56) References Cited

U.S. PATENT DOCUMENTS

| 8,859,175 B2 | 10/2014 | Sugawara et al. |
| 10,290,601 B2 | 5/2019 | Dietz et al. |

(Continued)

FOREIGN PATENT DOCUMENTS

| CN | 101782726 A | 7/2010 |
| CN | 107408514 A | 11/2017 |

(Continued)

OTHER PUBLICATIONS

Examination Report in German Application No. 10 2022 104 995.7 (May 2023).

(Continued)

*Primary Examiner* — Michael N Orlando
*Assistant Examiner* — Abhishek A Patwardhan
(74) *Attorney, Agent, or Firm* — Venable LLP

(57) ABSTRACT

A hot-melt adhesive comprising a thermoplastic resin and a first crystalline material, wherein when in differential scanning calorimetric measurement of the hot-melt adhesive, Tc (° C.) is a peak temperature of the highest peak of exothermic peaks observed in a temperature reduction process at 10° C./min following heating to 150° C. and Tm (° C.) is a peak temperature of the highest peak of endothermic peaks observed in a temperature increasing process at 10° C./min following the temperature reduction process, Tm−Tc is 20.0 to 70.0° C., and a tetrahydrofuran-soluble matter of the hot-melt adhesive has a weight-average molecular weight Mw, as measured by gel permeation chromatography, of 100,000 to 400,000.

8 Claims, 10 Drawing Sheets

(51) Int. Cl.
*C09J 11/08* (2006.01)
*C09J 125/14* (2006.01)

(56) References Cited

U.S. PATENT DOCUMENTS

| | | | |
|---|---|---|---|
| 10,662,356 B2 | 5/2020 | Hu et al. | |
| 2014/0186761 A1* | 7/2014 | Abe | G03G 9/09328 |
| | | | 430/108.3 |
| 2014/0363184 A1* | 12/2014 | Santo | G03G 9/0821 |
| | | | 399/68 |
| 2015/0004535 A1* | 1/2015 | Yamawaki | G03G 9/081 |
| | | | 430/108.8 |
| 2015/0234304 A1* | 8/2015 | Nagata | G03G 9/08764 |
| | | | 430/105 |
| 2015/0261111 A1* | 9/2015 | Inoue | G03G 9/0804 |
| | | | 430/108.4 |
| 2016/0246193 A1* | 8/2016 | Kamikura | G03G 9/0926 |
| 2017/0058067 A1 | 3/2017 | Ohtsu et al. | |
| 2019/0218437 A1* | 7/2019 | Hu | C09J 5/00 |
| 2019/0384197 A1* | 12/2019 | Aoki | G03G 9/08711 |
| 2019/0384198 A1* | 12/2019 | Matsui | C08F 220/1818 |
| 2021/0062056 A1 | 3/2021 | Kobayashi et al. | |
| 2022/0035261 A1 | 2/2022 | Shimano et al. | |
| 2022/0035262 A1 | 2/2022 | Nishikawa et al. | |
| 2022/0035264 A1 | 2/2022 | Yamashita et al. | |

FOREIGN PATENT DOCUMENTS

| | | |
|---|---|---|
| CN | 111194342 A | 5/2020 |
| DE | 102019100247 A1 | 7/2019 |
| JP | 7-17895 B2 | 3/1995 |
| JP | 2003-277717 A | 10/2003 |
| JP | 2009-293015 A | 12/2009 |
| JP | 2017-529422 A | 10/2017 |
| JP | 2018-123280 A | 8/2018 |
| JP | 2019-044107 A | 3/2019 |
| WO | 2016/029006 A1 | 2/2016 |
| WO | 2019/082434 A1 | 5/2019 |

OTHER PUBLICATIONS

First Office Action in Chinese Application No. 202210198921.8 (Jul. 2023).

Notification of Decision to Grant Patent Right in Chinese Application No. 202210198921.8 (Jun. 2024).

* cited by examiner

HOT-MELT ADHESIVE AND METHOD FOR PRODUCING BONDED ARTICLE

BACKGROUND OF THE INVENTION

Field of the Invention

The present disclosure relates to a hot-melt adhesive mainly for use for bonding paper media and also relates to a method for producing bonded articles using this hot-melt adhesive.

Description of the Related Art

Adhesives are materials that can bond substances through interposition between the substances. Bonding using adhesives provides an excellent appearance and also enables bonding between different types of materials and yields very durable bonded articles. A variety of adhesives are therefore used in numerous fields, e.g., furniture, construction, civil engineering, electrical electronic, automotive, packing materials (boxes and laminates), medical products, general household, and so forth.

While various classifications are possible, adhesives can be classified into liquid adhesives, which are represented by the liquid glues frequently used for general household applications, and solid adhesives, which are represented by hot-melt adhesives. A general advantage of liquid adhesives is their high adhesive strength, while the problem of requiring time for bonding is a disadvantage. The reason for this is as follows.

When coated on an adherend, a liquid adhesive infiltrates into the unevenness in the adherend, e.g., paper, and the adhesive strength appears due to solidification when the water or solvent present in the adhesive evaporates. Time is thus required for the appearance of adhesive strength since time is required until evaporation to the dry solid. On the other hand, while time is required until solidification, a high adhesive strength can appear due to the appearance of an anchoring effect due to infiltration into the unevenness of the adherend.

Conversely, a general advantage of solid adhesives is that time is not required for bonding, while the problem of a weak adhesive strength is a disadvantage. The reason for this is as follows. A solid adhesive, e.g., a hot-melt adhesive, is softened by, e.g., heating, immediately before coating on an adherend or after coating and can then infiltrate into the unevenness in the adherend. This is followed by cooling, which brings about solidification and the appearance of adhesive strength. As a result, less time is required for solidification by cooling than for evaporation to the dry solid. Since little time is required until solidification, the advantage accrues of requiring little time for bonding. However, due to the ease of solidification prior to infiltration into the unevenness, the appearance of a satisfactory anchoring effect is impaired, and the appearance of a high adhesive strength is also impeded. An adhesive is thus required that exhibits the advantages of both solid adhesives and liquid adhesives, i.e., an adhesive that can rapidly develop a high adhesive strength.

Within the sphere of art related to adhesives that can rapidly develop a high adhesive strength, for example, Japanese Patent Application Laid-open No. 2009-293015 discloses art concerning a two-package adhesive that rapidly develops a high adhesive strength by a radical polymerization reaction. Using an approach from the solid adhesive side, Japanese Patent Application Laid-open No. 2003-277717 discloses art concerning a reactive hot-melt adhesive.

SUMMARY OF THE INVENTION

Two-component adhesives as in Japanese Patent Application Laid-open No. 2009-293015 are an excellent art that enables the appearance of a high adhesive strength in a relatively short period of time. However, this art employs a chemical reaction, most prominently radical polymerization, during curing, and due to this the adherend can be unintentionally damaged, e.g., can be damaged by radical attack. Particularly in the case of printing on paper, the damage may also extend to a printed colorant in addition to damage to the paper. In addition, while the bonding time is relatively short, a time interval of several minutes to 60 minutes is required according to the description in Japanese Patent Application Laid-open No. 2009-293015, and thus a more rapid bonding art is required.

The reactive hot-melt adhesive as in Japanese Patent Application Laid-open No. 2003-277717 is an art in which an excellent adhesive strength appears due to a rapid initial bonding due to solidification by cooling followed by curing due to humidity. An excellent adhesive strength is also exhibited by the final bonded article with this art, but time is a problem due to the humidity cure.

The present disclosure provides an adhesive that exhibits the advantages of both a solid adhesive and a liquid adhesive, i.e., a hot-melt adhesive that can develop a high adhesive strength in a shorter period of time. The present disclosure also provides a method for producing bonded articles using this hot-melt adhesive.

A hot-melt adhesive comprising a thermoplastic resin and a first crystalline material, wherein
  when in differential scanning calorimetric measurement of the hot-melt adhesive, Tc (° C.) is a peak temperature of the highest peak of exothermic peaks observed in a temperature reduction process at 10° C./min following heating to 150° C. and
  Tm (° C.) is a peak temperature of the highest peak of endothermic peaks observed in a temperature increasing process at 10° C./min following the temperature reduction process,
  Tm−Tc is 20.0 to 70.0° C., and
  a tetrahydrofuran-soluble matter of the hot-melt adhesive has a weight-average molecular weight Mw, as measured by gel permeation chromatography, of 100,000 to 400,000.

The present disclosure can thus provide an adhesive that exhibits the advantages of both a solid adhesive and a liquid adhesive, i.e., a hot-melt adhesive that can develop a high adhesive strength in a shorter period of time, and can also provide a method for producing bonded articles using this hot-melt adhesive. Further features of the present invention will become apparent from the following description of exemplary embodiments with reference to the attached drawing.

DESCRIPTION OF THE EMBODIMENTS

Figure 1:
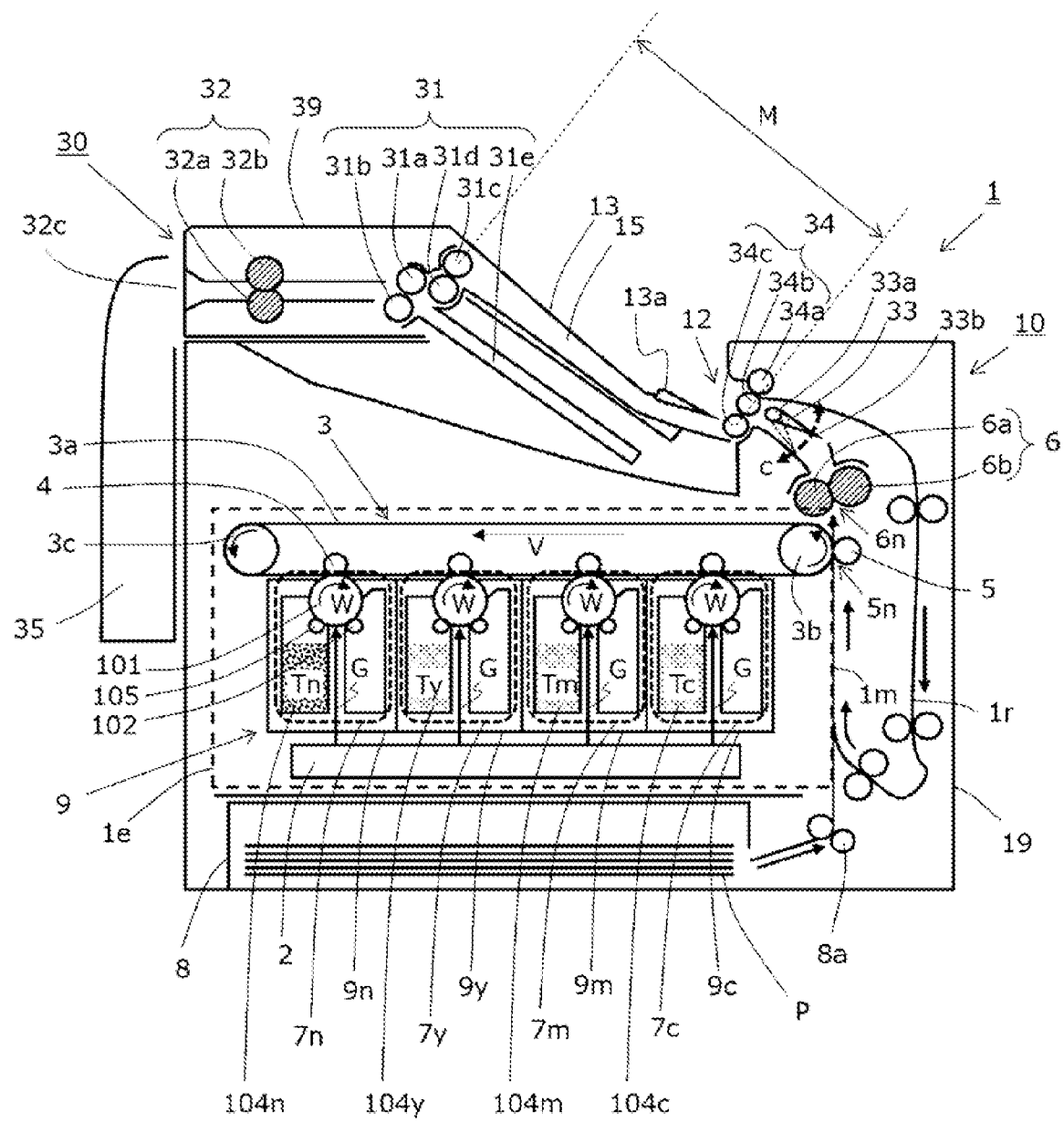
FIG. 1 is a schematic drawing of an image forming apparatus.

In the present disclosure, unless specifically indicated otherwise, the expressions "from XX to YY" and "XX to YY" that show numerical value ranges refer in the present disclosure to numerical value ranges that include the lower limit and upper limit that are the end points. When numerical value ranges are provided in stages, the upper limits and lower limits of the individual numerical value ranges may be combined in any combination.

The present inventors carried out investigations based on adhesion mechanisms in order to solve the aforementioned problem. As noted above, adhesion is the bonding of two materials via an interposed adhesive. The bonding strength between the adherend and adhesive is also crucial for the development of a high adhesive strength here. The present inventors therefore carried out investigations into art for raising the adherend/adhesive bonding strength. In order to enhance the bonding strength, it is first necessary that the adhesive infiltrates into the adherend. Since unevenness is present to some extent in the adherend, an anchoring effect can be developed, and the bonding strength can then be increased, by having the adhesive infiltrate and fill the unevenness. When the adherend resides at normal temperature, the hot-melt adhesive is cooled by the adherend and the problem arises that the hot-melt adhesive readily undergoes cooling and solidification prior to its infiltration. The present inventors therefore carried out investigations based on the thinking that it would be critical to secure the period of time until the hot-melt adhesive infiltrates into the adherend.

A strategy considered for extending the time until cooling-induced solidification was to carry out melting with the temperature for bringing about melting of the hot-melt adhesive being raised to significantly higher than the melting point of the hot-melt adhesive. It was thought that doing this could gain cooling time until the melting point. However, while the result was to somewhat extend the time until solidification, enough time for infiltration could not be secured. This is thought to be caused by the following: even if the adhesive does infiltrate into the adherend, the flow path for the adhesive at the infiltration sites is fine and as a consequence a small amount of adhesive is surrounded by a large amount of adherend, and rapid cooling ends up occurring.

The present inventors therefore carried out efforts to lower the freezing point, where the adhesive undergoes solidification. When this was done, enough time for infiltration into the adherend could be secured, but the adhesive strength could not be maintained in high-temperature environments because the melting point was reached by just a small rise in the temperature of the environment surrounding the bonded article and the adhesive melted out. Thus, due to the drawback of a reduction in the heat resistance of the bonded article when the freezing point of a hot-melt adhesive is lowered, the idea of lowering the freezing point is not generally current. The present inventors carried out investigations in order to solve this drawback and discovered that the problem could be solved by bringing about a hysteresis behavior in the hot-melt adhesive whereby the melting point and freezing point are different. It was thus thought that the problem could be solved by establishing a state in which the freezing point is low when the hot-melt adhesive is infiltrating into the adherend and establishing a high melting point after infiltration and solidification.

The melting point at which melting occurs and the freezing point at which solidification by cooling occurs are frequently approximately the same temperature for the substances commonly incorporated in hot-melt adhesives. For example, the temperature at which water solidifies into ice is 0° C. and the temperature at which ice melts into water is also 0° C. Organic polymer compounds also include species that exhibit a hysteresis behavior in which the melting point and freezing point are different, but this difference is generally about 10° C.

When in differential scanning calorimetric measurement of the hot-melt adhesive, Tc (° C.) is a peak temperature of the highest peak of exothermic peaks observed in a temperature reduction process at 10° C./min following heating to 150° C. and Tm (° C.) is a peak temperature of the highest peak of endothermic peaks observed in a temperature increasing process at 10° C./min following the temperature reduction process, Tm−Tc for the hot-melt adhesive must be 20.0 to 70.0° C.

Tm−Tc must be at least 20.0° C. in order to establish a large hysteresis behavior for the melting point and freezing point. The present inventors believe as follows with regard to the mechanism for establishing such a large hysteresis behavior. A large difference between Tm and Tc generally indicates a slow crystallization rate. It is hypothesized that, by using a hot-melt adhesive with a slow crystallization rate, crystallization of the adhesive is slowed down and as a result the melted state is maintained due to the heat generated in association with crystallization, thus making it possible to secure the time interval until infiltration.

According to the results of investigations by the present inventors, a satisfactory adhesive strength could be developed due to the large hysteresis behavior when Tm−Tc is at least 20.0° C. Bonding in a short period of time, on the other hand, was made possible by having Tm−Tc be not more than 70.0° C. Tm−Tc is more preferably from 24.0° C. to 50.0° C. and Tm−Tc is even more preferably from 28.0° C. to 40.0° C. The peak that produces Tm preferably is a peak assigned to the first crystalline material. The peak that produces Tc preferably is also a peak assigned to the first crystalline material.

The means for controlling Tm−Tc is not particularly limited, but can be exemplified by incorporating a thermoplastic resin and a crystalline material into the hot-melt adhesive and increasing their compatibility. The "crystalline material" indicates a material for which, in measurement of the pure material by differential scanning calorimetry, a distinct exothermic peak or endothermic peak (preferably an exothermic peak and an endothermic peak) is measured. The measurement conditions at this time are as follows: heating from 20° C. to 200° C. at 10° C./min, then cooling from 200° C. to 20° C. at 10° C./min, and then heating from 20° C. to 200° C. at 10° C./min. A crystalline material is defined as a material for which an exothermic peak based on crystallization or an endothermic peak associated with melting (preferably both) is measured in at least in one of the steps.

A specific means can be exemplified first by a material selection in which a combination of highly compatible materials is selected for the thermoplastic resin and first crystalline material that are the main materials in the hot-melt adhesive. The material combination preferably corresponds to a degree of compatibilization A given by the following formula (1) for the thermoplastic resin and first crystalline material of from 50% to 100%.

$$\text{degree of compatibilization } A\ (\%) = 100 - (100 \times \Delta H(A))/(\Delta H(C) \times C/100) \quad (1)$$

$\Delta H(A)$ represents an exothermic value (J/g), according to differential scanning calorimetric measurement, of exothermic peaks for a mixed resin A of the thermoplastic resin of 88.1 mass % and the first crystalline material of 11.9 mass %. $\Delta H(C)$ represents an exothermic value (J/g), according to differential scanning calorimetric measurement, of exothermic peaks of the first crystalline material. C represents a mass ratio (%) of the first crystalline material in the mixed resin A and C is 11.9. The degree of compatibilization A is more preferably from 80% to 100% and is still more preferably from 90% to 100%.

A step of heat treating the hot-melt adhesive using the conditions of the following (process a) and (process b) during production of the adhesive is preferably adopted as a means for further increasing the compatibility between the thermoplastic resin and the first crystalline material. In addition, the compatibility can also be raised by carrying out the following (process a) before the following (process b). When the hot-melt adhesive is produced by a suspension polymerization method, described below, processes a and b are preferably carried out on the slurry after the polymerization step.

(process a): a process of carrying out a heat treatment, in the presence of the thermoplastic resin and the first crystalline material, of the hot-melt adhesive for at least 30 minutes (preferably 45 minutes to 90 minutes) at a temperature higher than the melting point measured on the pure first crystalline material by differential scanning calorimetry.

(process b): a process, carried out after process a, of rapid cooling the hot-melt adhesive to a temperature that is at least 10° C. lower than the melting point measured for the pure first crystalline material by differential scanning calorimetry.

In (process a), the crystalline material is first thoroughly melted and made compatible with the thermoplastic resin by the execution of a heat treatment at a temperature that is higher than the melting point of the first crystalline material. Using Tm1 for the melting point of the first crystalline material, this temperature preferably is higher than Tm1 and is not more than (Tm1+50° C.) and is more preferably from (Tm1+10° C.) to (Tm1+40° C.). When the crystalline material has a high melting point and temperature increasing is then problematic, the compatibility can also be raised by extending the time.

In (process b), it is thought that rapid cooling to a temperature that is at least 10° C. lower than the melting point of the first crystalline material makes possible solidification in the extant condition of compatibility, as in flash freezing, and can raise the compatibility. The temperature gradient during the rapid cooling can be freely established in conformity to the selected material, but the cooling rate is preferably at least 1° C./sec and is more preferably at least 3° C./sec. The upper limit is not particularly restricted, but is preferably not more than 10° C./sec and is more preferably not more than 6° C./sec.

The tetrahydrofuran-soluble matter of the hot-melt adhesive must have a weight-average molecular weight Mw, as measured by gel permeation chromatography, of from 100,000 to 400,000. An Mw of at least 100,000 makes it possible to obtain a high adhesive strength because a satisfactory anchoring effect is then obtained after the adhesive has solidified. An Mw of not more than 400,000 makes it possible to obtain a high adhesive strength because the viscosity when melted is then low and infiltration into the adherend is facilitated. Mw is more preferably from 150,000 to 350,000 and is still more preferably from 180,000 to 300,000.

The number-average molecular weight Mn of the hot-melt adhesive is preferably from 5,000 to 50,000 and more preferably from 10,000 to 40,000. The peak molecular weight Mp is preferably from 10,000 to 100,000 and is more preferably from 15,000 to 50,000. The molecular weight can be controlled through the molecular weights of the starting materials that constitute the hot-melt adhesive. When the hot-melt adhesive is synthesized by, for example, a polymerization reaction, the molecular weight can be controlled by adjusting the polymerization conditions, e.g., the amount of polymerization initiator, the reaction temperature, and so forth.

The glass transition temperature Tg of the thermoplastic resin is preferably 40° C. to 90° C. and more preferably 50° C. to 65° C. The glass transition temperature can be controlled through the ratio between the starting materials that constitute the hot-melt adhesive.

The content of the thermoplastic resin in the hot-melt adhesive is preferably 60.0 mass % to 99.9 mass %, more preferably 70.0 mass % to 95.0 mass %, and still more preferably 75.0 mass % to 92.0 mass %.

The proportion on a mass basis of the first crystalline material with reference to the thermoplastic resin (first crystalline material/thermoplastic resin) is preferably 0.05 to 0.50, more preferably 0.10 to 0.40, and still more preferably 0.10 to 0.30.

A content in of tetrahydrofuran-insoluble matter, in the hot-melt adhesive, which is not extracted by Soxhlet extraction of the hot-melt adhesive for 16 hours using tetrahydrofuran (THF) is preferably from 20 mass % to 60 mass %. The content of the THF-insoluble matter represents the amount of crosslinked polymer in the thermoplastic resin of the hot-melt adhesive. Crosslinking reactions are also used by, e.g., curable adhesives, for strong adhesion, and a high adhesive strength can be developed when the THF-insoluble matter content is at least 20%. A content of THF-insoluble matter of not more than 60 mass % makes it possible to obtain a high adhesive strength because the viscosity when melted is then low and infiltration into the adherend is facilitated. The content of the THF-insoluble matter is more preferably from 30 mass % to 40 mass %. The content of the THF-insoluble matter can be controlled by adjusting, for example, the amount of crosslinking agent addition.

The hot-melt adhesive preferably further contains a second crystalline material. A degree of compatibilization B given by a following formula (2) for this second crystalline material and the thermoplastic resin is preferably from 10% to 50%.

$$\text{degree of compatibilization } B\ (\%) = 100 - (100 \times \Delta H(B))/(\Delta H(C2) \times D/100) \quad (2)$$

$\Delta H(B)$ represents an exothermic value (J/g), according to differential scanning calorimetric measurement, of exothermic peaks for a mixed resin B of the thermoplastic resin of 98.1 mass % and the second crystalline material of 1.9 mass %. $\Delta H(C2)$ represents an exothermic value (J/g), according to differential scanning calorimetric measurement, of exothermic peaks of the second crystalline material. D represents a mass ratio (%) of the second crystalline material in the mixed resin B and D is 1.9. The degree of compatibilization B is more preferably from 20% to 45% and is still more preferably from 30% to 40%.

The co-incorporation of a second crystalline material having a low degree of compatibilization with the thermoplastic resin provides rapid melting when the hot-melt adhesive is heated and enables the appearance of a higher adhesive strength. This is hypothesized to be due to the second crystalline material forming crystal nuclei and the first crystalline material becoming finely dispersed in the resin as a whole and the resin as a whole then rapidly melting when the adhesive is heated.

The content of the second crystalline material in the hot-melt adhesive can be freely established in conformity to the thermoplastic resin and first crystalline material that have been selected, but is preferably from 0.5 mass % to 5.0 mass % and is more preferably from 1.0 mass % to 3.0 mass %.

Tc for the hot-melt adhesive is preferably from 20° C. to 60° C. and Tm is preferably from 50° C. to 110° C. Bonding in a shorter period of time is made possible by having Tc be at least 20° C., while having Tc be not more than 60° C. makes it unnecessary to use an excessive amount of energy to melt the hot-melt adhesive when bonding is carried out. In addition, a better heat resistance for the resulting bonded article can be obtained by having Tm be at least 50° C., while having Tm be not more than 110° C. makes it unnecessary to use an excessive amount of energy to melt the hot-melt adhesive when bonding is carried out.

Tc can be controlled through the type of thermoplastic resin and type of first crystalline material that are selected and by increasing their compatibility. Specific means for increasing the compatibility are as described below. Tm can be controlled, for example, using the type of first crystalline material that is selected and by providing a crystallization step for the crystalline material after the aforementioned (process b). Tc is more preferably from 30° C. to 50° C. and still more preferably from 35° C. to 45° C. Tm is more preferably from 55° C. to 90° C. and still more preferably from 60° C. to 80° C.

The viscosity of the hot-melt adhesive at 100° C., as measured with a capillary rheometer operating on the constant load extrusion principle, is preferably from 20,000 Pa·s to 100,000 Pa·s. Because the viscosity at 100° C. is in the indicated range, the adhesive can then have a suitable melt viscosity and a higher adhesive strength can be developed. The viscosity at 100° C. is more preferably from 30,000 Pa·s to 80,000 Pa·s and still more preferably from 40,000 Pa·s to 70,000 Pa·s. The viscosity at 100° C. can be controlled through, for example, the glass transition temperature, amount of THF-insoluble matter, and molecular weight of the hot-melt adhesive.

The thermoplastic resins contained in the hot-melt adhesive are not particularly limited.

Specific examples include known thermoplastic resins such as polyester resins, vinyl resins, acrylic resins, styrene-acrylic resins, polyethylene, polypropylene, polyolefins, ethylene-vinyl acetate copolymer resins, and ethylene-acrylic acid copolymer resins. The hot-melt adhesive may include a plurality of these resins.

The thermoplastic resin preferably is an amorphous resin. Preferably, the thermoplastic resins contained in the hot-melt adhesive include at least one selected from the group consisting of polyester resins and styrene-acrylic resins, and include more preferably a styrene-acrylic resin. The content of the styrene-acrylic resin in the thermoplastic resins is preferably 50 mass % to 100 mass %, more preferably 80 mass % to 97 mass %, and yet more preferably 90 mass % to 95 mass %.

A known polyester resin can be used as the polyester resin.

Specific examples include dibasic acids and derivatives thereof (carboxylic acid halides, esters, and acid anhydrides) and condensed polymers of dihydric alcohols. If necessary, trivalent or higher polybasic acids and derivatives thereof (carboxylic acid halides, esters, and acid anhydrides), monobasic acids, trihydric or higher alcohols, and monohydric alcohols may be used.

Examples of the dibasic acid include aliphatic dibasic acids such as maleic acid, fumaric acid, itaconic acid, oxalic acid, malonic acid, succinic acid, dodecylsuccinic acid, dodecenylsuccinic acid, adipic acid, azelaic acid, sebacic acid, decane-1,10-dicarboxylic acid, and the like; aromatic dibasic acids such as phthalic acid, tetrahydrophthalic acid, hexahydrophthalic acid, tetrabromophthalic acid, tetrachlorophthalic acid, chlorendic acid, himic acid, isophthalic acid, terephthalic acid, 2,6-naphthalenedicarboxylic acid, and the like; and the like.

Examples of the dibasic acid derivatives include carboxylic acid halides, esters and acid anhydrides of the above-mentioned aliphatic dibasic acid and aromatic dibasic acid.

Meanwhile, examples of the dihydric alcohol include acyclic aliphatic diols such as ethylene glycol, 1,2-propanediol, 1,3-propanediol, 1,4-butanediol, 1,5-pentanediol, 1,6-hexanediol, diethylene glycol, dipropylene glycol, triethylene glycol, neopentyl glycol, and the like; bisphenols such as bisphenol A, bisphenol F, and the like; alkylene oxide adducts of bisphenol A such as bisphenol A ethylene oxide adduct, bisphenol A propylene oxide adduct, and the like; aralkylene glycols such as xylylene diglycol and the like; and the like.

Examples of the trivalent or higher polybasic acid and anhydrides thereof include trimellitic acid, trimellitic anhydride, pyromellitic acid, pyromellitic anhydride, and the like. The content of the polyester resin in the thermoplastic resins is preferably 1 mass % to 10 mass %, more preferably 2 mass % to 5 mass %.

The styrene-acrylic resin is a copolymer of a styrenic monomer and at least one selected from the group consisting of unsaturated carboxylic acid esters such as acrylate esters and methacrylate esters. The styrenic monomer preferably includes styrene. The proportion in this copolymer of the monomer unit provided by the polymerization of styrene is preferably 50 mass % to 90 mass %, more preferably 60 mass % to 85 mass %, and still more preferably 70 mass % to 80 mass %. The proportion in this copolymer of monomer units provided by the polymerization of at least one selected from the group consisting of unsaturated carboxylic acid esters is preferably 10 mass % to 50 mass %, more preferably 15 mass % to 40 mass %, and still more preferably 20 mass % to 30 mass %.

Examples of the polymerizable monomer capable of forming the styrene-acrylic resin include styrene-based monomers such as styrene, α-methylstyrene, and divinylbenzene; unsaturated carboxylic acid esters such as methyl acrylate, butyl acrylate, methyl methacrylate, and 2-hydroxyethyl methacrylate, t-butyl methacrylate, and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile vinyl monomers such as acrylonitrile; halogen-containing vinyl monomers such as vinyl chloride; nitrovinyl monomers such as nitrostyrene; and the like. These can be used alone or in combination of two or more.

The unsaturated carboxylic acid ester is preferably an alkyl (meth)acrylate ester having an alkyl group having 1 to 8 (more preferably 2 to 6) carbon atoms. The styrene-acrylic resin is preferably a copolymer of monomer that includes styrene and an alkyl (meth)acrylate ester having an alkyl group having 1 to 8 (more preferably 2 to 6) carbon atoms. The styrene-acrylic resin is preferably a copolymer of a crosslinking agent, styrene, and an alkyl (meth)acrylate ester having an alkyl group having 1 to 8 (more preferably 2 to 6) carbon atoms.

A crosslinking agent is preferably added when the thermoplastic resin is produced. That is, the thermoplastic resin preferably has a crosslinked structure provided by a crosslinking agent. The amount of the crosslinking agent-derived structure (crosslinked structure) in the thermoplastic resin is preferably 0.01 mass % to 1.0 mass % and is more preferably 0.1 mass % to 0.5 mass %.

Examples of the crosslinking agent include divinyl benzene, bis(4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, acrylates of polyethylene glycol #200, #400 and #600, dipropylene glycol diacrylate, polypropylene glycol diacrylate, polyester diacrylate (MANDA, Nippon Kayaku), and the above acrylates converted to methacrylates.

Examples of polyfunctional crosslinkable monomers include pentaerythritol triacrylate, trimethylolethane triacrylate, trimethylolpropane triacrylate, tetramethylolmethane tetraacrylate, oligoester acrylate and methacrylate, 2,2-bis (4-methacryloxy-polyethoxyphenyl) propane, diacryl phthalate, triallyl cyanurate, triallyl isocyanurate, triallyl trimellitate and diaryl chlorendate.

The first crystalline material incorporated in the hot-melt adhesive is not particularly limited, and known materials can be used, for example, at least one selected from ester waxes and fatty acid metal salts such as zinc stearate and aluminum stearate. The first crystalline material preferably contains an ester wax and more preferably is an ester wax. Ester waxes have a polar ester group segment and a hydrophobic hydrocarbon segment and thus can exhibit an effect for a wide range of adherends. Most prominently monoester compounds having one ester bond in each molecule and diester compounds having two ester bonds in each molecule, but also multivalent ester compounds, e.g., trivalent ester compounds having three ester bonds in each molecule, tetravalent ester compounds having four ester bonds in each molecule, and hexavalent ester compounds having six ester bonds in each molecule, can be used as the ester wax.

The first crystalline material preferably contains, among the preceding, at least one compound selected from the group consisting of monoester compounds and diester compounds. The monoester compounds can be specifically exemplified by waxes in which the main component is a fatty acid ester, e.g., carnauba wax and montanic acid ester waxes; the products of the partial or complete deacidification of the acid component from a fatty acid ester, e.g., deacidified carnauba wax; products obtained, for example, by the hydrogenation of a plant oil or fat; hydroxy group-bearing methyl ester compounds; and saturated fatty acid monoesters such as stearyl stearate and behenyl behenate.

The diester compounds can be specifically exemplified by dibehenyl sebacate, nonanediol dibehenate, behenyl terephthalate, and stearyl terephthalate. The first crystalline material may contain another known wax besides the preceding compounds.

The monoester compounds and diester compounds tend to have a higher crystallinity and a larger endothermic quantity than hydrocarbon waxes and trivalent and higher valent ester compounds. As a consequence, when the hot-melt adhesive is melted during the bonding step, the melting behavior of the wax is readily matched and the effects due to the aforementioned properties are readily obtained.

The first crystalline material preferably contains at least one selected from the group consisting of ester waxes given by the following formula (3) and ester waxes given by the following formula (4).

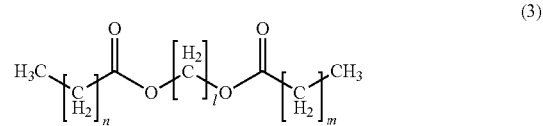

(3)

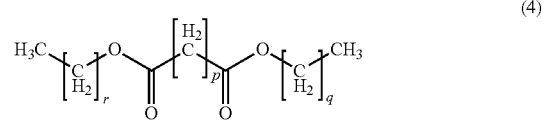

(4)

In the formulas, l represents a positive integer from 2 to 12 (preferably from 2 to 4), and n and m each independently represent a positive integer from 12 to 20 (preferably from 14 to 20). p represents a positive integer from 2 to 10 (preferably from 2 to 4), and q and r each independently represent a positive integer from 11 to 21 (preferably from 14 to 20). The ester waxes given by formulas (3) and (4) strongly interact with polar groups in the adherend due to the close positioning of the ester groups. As a result, the effects can be developed for a broad range of adherend types.

The ester wax is more preferably a compound given by the following formula (5). The first crystalline material more preferably contains an ester wax given by the following formula (5).

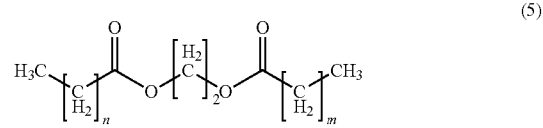

(5)

n and m in the formula each independently represent a positive integer from 14 to 20. The ester wax content, per 100 mass parts of the thermoplastic resin, is preferably from 0.3 mass parts to 30.0 mass parts, more preferably from 3.0 mass parts to 25.0 mass parts, and still more preferably from 5.0 mass parts to 20.0 mass parts.

The second crystalline material preferably contains a hydrocarbon wax, e.g., a paraffin wax, microcrystalline wax, Fischer-Tropsch wax, and so forth. Hydrocarbon waxes crystallize more rapidly than the aforementioned ester waxes and can effectively act as crystal nucleating agents for the ester waxes.

The form of use for the hot-melt adhesive is not particularly limited, but use in a powder form facilitates uniform loading at the bonding surface and is thus preferred. In particular, the weight-average particle diameter (D4) of the hot-melt adhesive is preferably from 0.1 μm to 100.0 μm. It is more preferably from 1.0 μm to 30.0 μm and is still more preferably from 3.0 μm to 15.0 μm.

The method for producing the hot-melt adhesive is not particularly limited, but the application of known toner production methods in order to obtain a powder in the aforementioned particle diameter range is preferred. Toner production methods can be exemplified by the pulverization method, suspension polymerization method, emulsion aggregation method, and dissolution suspension method.

Among the preceding, the suspension polymerization method is preferred from the standpoint of having the storability coexist with a strong adhesiveness by the hot-melt adhesive. When, in order to improve the adhesiveness of the hot-melt adhesive, a lowering of the viscosity of the thermoplastic resin was pursued through a reduction in the Tg and a reduction in the molecular weight, the present inventors discovered that the storability in high-temperature, high-humidity environments is substantially improved by using the suspension polymerization method. The hot-melt adhesive is preferably a hot-melt adhesive produced by the suspension polymerization method.

In the case of the thermoplastic resin in a hot-melt adhesive produced by the suspension polymerization method, resin elongation occurs at the same time as particle formation. The inventors believe that molecular entanglement at this time is influential. In particular, a substantial storability-improving effect appears when a crosslinking agent is used.

In the suspension polymerization method, a polymerizable monomer composition is first obtained by dispersing the first crystalline material and optionally a second crystalline material, an additional thermoplastic resin, wax, crosslinking agent, charge control agent, and other additives to uniformity in polymerizable monomer that can form the thermoplastic resin. This is followed by dispersion of the resulting polymerizable monomer composition in a continuous phase (for example, an aqueous phase) that contains a dispersion stabilizer to form particles of the polymerizable monomer composition (granulation), and the execution of a polymerization reaction by the polymerizable monomer to yield the hot-melt adhesive.

The hot-melt adhesive may contain a colorant on an optional basis. With regard to organic pigments, an organic pigment is preferably used in a small amount in the required range from the standpoint of providing a better crystallization of the hot-melt adhesive. The hot-melt adhesive preferably substantially does not contain an organic pigment. "Substantially does not contain" means that organic pigment may be contained in trace amounts that are unavoidably slightly admixed during production of the hot-melt adhesive. The organic pigment content is preferably from 0.0 mass % to 1.0 mass % and more preferably from 0.0 mass % to 0.1 mass %.

The hot-melt adhesive may contain known materials such as a charge control agent, a charge control resin and a pigment dispersant, as needed. As the case may require, the hot-melt adhesive may be mixed with an external additive or the like to adhere to the surface of the hot-melt adhesive. Examples of the external additive include inorganic fine particles selected from silica fine particles, alumina fine particles and titania fine particles, and complex oxides of the foregoing. Examples of complex oxides include silica alumina fine particles and strontium titanate fine particles. The content of the external additive in the hot-melt adhesive is preferably from 0.01 mass % to 10.0 mass %, more preferably from 0.1 mass % to 4.0 mass %.

When the hot-melt adhesive is used in powder form, it can also be used in the form of a toner- and powder adhesive-containing electrophotographic developer set that, through development of electrostatic latent images on a recording material utilizing an electrophotographic system, forms a toner image and a bonding region that uses the hot-melt powder adhesive (also referred to hereafter as the "powder adhesive"). The utilization of an electrophotographic system enables a fine and precise control of the region of adhesive application and is thus preferred. An example of a method for fabricating a paper bag using this toner- and powder adhesive-containing electrophotographic developer set and an electrophotographic system will be described.

A toner-based image region and an powder adhesive-based bonding region are first formed and developed on paper using an electrophotographic system (development step). This is followed by heating to fix the image region and bonding region on the paper (fixing step), and the paper bag is fabricated by overlaying the paper so as to sandwich the bonding region, by heating, and by bonding by melting the bonding region (bonding step). When this is done, the paper overlaying procedure may be to fold the paper or to overlay different sheets of paper.

Specifically described hereinbelow is an example of an image forming apparatus and a processing device for bonding paper.

Overall Apparatus Configuration

First, the overall configuration of the image forming apparatus will be described with reference to FIGS. 1, 2, and 5. FIG. 1 is a schematic diagram illustrating a cross-sectional configuration of an image forming apparatus 1 including an image forming apparatus body (hereinafter, referred to as an apparatus body 10) and a post-processing unit 30 connected to the apparatus body 10. The image forming apparatus 1 is an electrophotographic image forming apparatus (electrophotographic system) configured of the apparatus body 10 provided with an electrophotographic printing mechanism, and a post-processing unit 30 as a sheet processing device.

Figure 5:
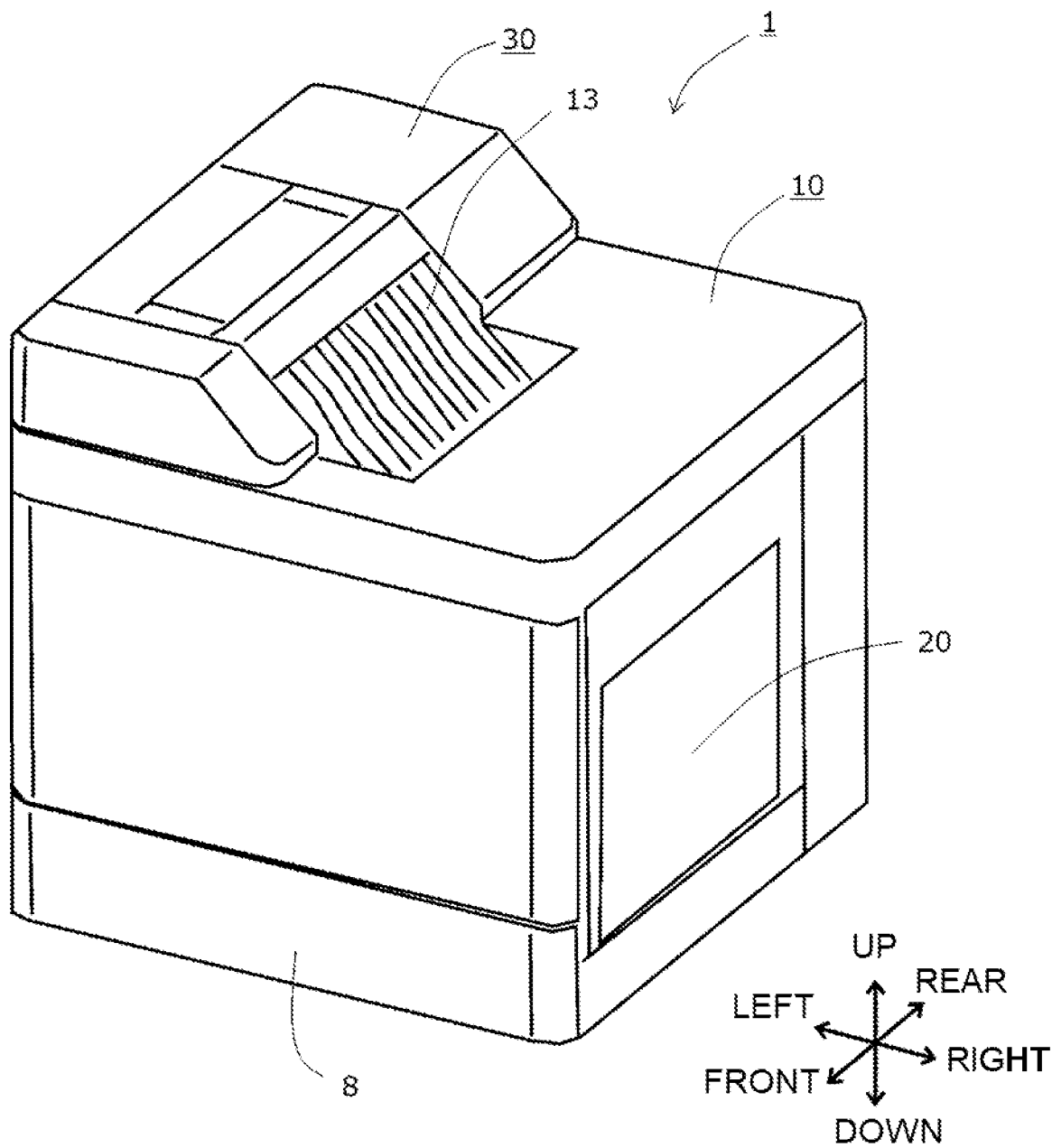
FIG. 5 is a perspective-view diagram illustrating the appearance of an image forming apparatus.

FIG. 5 is a perspective-view diagram illustrating the appearance of the image forming apparatus 1. The post-processing unit 30 is mounted on top of the apparatus body 10. The image forming apparatus 1 has a sheet cassette 8 at the bottom, an openable/closable tray 20 on the right side, and a first discharge tray 13 on the top side. First, the internal configuration of the apparatus body 10 will be described. As shown in FIG. 1, the apparatus body 10 is provided with the sheet cassette 8 as a sheet accommodating portion for accommodating a sheet P which is a recording medium, an image forming unit 1e as an image forming means, a first fixing unit 6 as a fixing means, and a housing 19 for accommodating these units. The apparatus body 10 has a printing function of forming a toner image on the sheet P fed from the sheet cassette 8 by an image forming unit 1e and producing a printed product subjected to a fixing process by the first fixing unit 6.

The sheet cassette 8 is retractably inserted into the housing 19 at the bottom of the apparatus body 10, and accommodates a large number of sheets P. The sheets P accommodated in the sheet cassette 8 are fed from the sheet cassette 8 by a feeding member such as a feeding roller, and are transported by a transport roller 8a in a state of being separated one by one by a pair of separating rollers. It is also possible to feed the sheets set on an open tray 20 (FIG. 5) one by one.

The image forming unit 1e is a tandem type electrophotographic unit provided with four process cartridges 7n, 7y, 7m, and 7c, a scanner unit 2, and a transfer unit 3. The term process cartridge denotes a unit in which multiple components involved in the image forming process are integrally and replaceably configured into a unit. The apparatus body 10 is provided with a cartridge support portion 9 supported by the housing 19, and the process cartridges 7n, 7y, 7m, and 7c are detachably mounted on mounting portions 9n, 9y, 9m, and 9c provided in the cartridge support portion 9. The cartridge support portion 9 may be a tray member that can be pulled out from the housing 19.

The process cartridges 7n, 7y, 7m, and 7c have a substantially common configuration except for the types of powders accommodated in four powder accommodating portions 104n, 104y, 104m, and 104c. That is, each process cartridge 7n, 7y, 7m, and 7c includes a photosensitive drum 101 as an image bearing member, a charging roller 102 as a charging device, powder accommodating portions 104n, 104y, 104m, and 104c that accommodate powders, and a developing roller 105 that performs development using the powder.

Of the four powder accommodating portions, the three powder accommodating portions 104y, 104m, and 104c on the right side in the figure accommodate yellow, magenta and cyan printing toners Ty, Tm, and Tc, respectively, as toners (first powder) for forming a visible image on the sheet P. Meanwhile, a powder adhesive Tn, which is a powder (second powder) for performing a bonding process after printing, is accommodated in the powder accommodating portion 104n on the leftmost side in the figure.

The powder accommodating portions 104y, 104m, and 104c are all examples of the first accommodating portion that accommodates the printing toner, and the powder accommodating portion 104n is an example of the second accommodating portion that accommodates the powder adhesive. Further, the process cartridges 7y, 7m, and 7c are all examples of the first process unit that forms a toner image using a printing toner, and the process cartridge 7n is an example of the second process unit that forms an image of a powder adhesive in a predetermined application pattern.

When printing a black image such as text, the image is expressed in process black in which yellow (Ty), magenta (Tm), and cyan (Tc) toners are superimposed. However, for example, a fifth process cartridge that uses a black printing toner may be added to the image forming unit 1e so that the black image can be expressed by the black printing toner. Such options are not limiting, and the type and number of printing toners can be changed according to the application of the image forming apparatus 1.

The scanner unit 2 is arranged below the process cartridges 7n, 7y, 7m, and 7c and above the sheet cassette 8. The scanner unit 2 is an exposure means for irradiating the photosensitive drum 101 of each process cartridge 7n, 7y, 7m, and 7c with laser light G and writing an electrostatic latent image.

The transfer unit 3 includes a transfer belt 3a as an intermediate transfer body (secondary image bearing member). The transfer belt 3a is a belt member wound around a secondary transfer inner roller 3b and a tension roller 3c, and faces the photosensitive drum 101 of each process cartridge 7n, 7y, 7m, and 7c on the outer peripheral surface.

On the inner peripheral side of the transfer belt 3a there are arranged primary transfer rollers 4, at positions corresponding to respective photosensitive drums 101. Further, a secondary transfer roller 5 as a transfer means is arranged at a position opposing the secondary transfer inner roller 3b. A transfer nip 5n between the secondary transfer roller 5 and the transfer belt 3a is a transfer section (secondary transfer section) in which the toner image is transferred from the transfer belt 3a to the sheet P.

The first fixing unit 6 is arranged above the secondary transfer roller 5. The first fixing unit 6 is a heat fixing type fixing unit having a heat roller 6a as a heating member and a pressure roller 6b as a pressing member. The heat roller 6a is heated by a heat generating element such as a halogen lamp, a ceramic heater or a heating mechanism of induction heating type. The pressure roller 6b is pressed against the heat roller 6a by an urging member such as a spring, and generates a pressurizing force that pressurizes the sheet P passing through the nip portion (fixing nip 6n) of the heat roller 6a and the pressure roller 6b.

The housing 19 is provided with a discharge port 12 (first discharge port), which is an opening for discharging the sheet P from the apparatus body 10, and a discharge unit 34 is arranged in the discharge port 12. The discharge unit 34, which is a discharge means, uses a so-called triple roller having a first discharge roller 34a, an intermediate roller 34b, and a second discharge roller 34c.

Further, a switching guide 33, which is a flap-shaped guide for switching the transport path of the sheet P, is provided between the first fixing unit 6 and the discharge unit 34. The switching guide 33 is rotatable around a shaft portion 33a so that a tip 33b reciprocates in the direction of arrow c in the figure.

The apparatus body 10 is provided with a mechanism for performing double-sided printing. A motor (not shown) is connected to the discharge unit 34 and configured so that the rotation direction of the intermediate roller 34b can be forward and reverse. Further, a double-sided transport path 1r is provided as a transport path connected in a loop to a main transport path 1m. The sheet P where an image has been formed on the first surface while passing through the main transport path 1m is nipped and transported by the first discharge roller 34a and the intermediate roller 34b with the switching guide 33 which is rotated clockwise.

After the rear end of the sheet P in the traveling direction passes through the switching guide 33, the switching guide 33 rotates counterclockwise, the intermediate roller 34b reverses, and the sheet P is reversely transported to the double-sided transport path 1r. Then, an image is formed on the second surface of the sheet P while the sheet P passes through the main transport path 1m again with the front and back reversed.

The sheet P after double-sided printing is nipped and transported by the intermediate roller 34b and the second discharge roller 34c with the switching guide 33 rotated counterclockwise, and is discharged from the apparatus body 10. Further, the transport path passing through the transport roller 8a, the transfer nip 5n, and the fixing nip 6n in the apparatus body 10 constitutes the main transport path 1m in which an image is formed on the sheet P. The main transport path 1m extends from the bottom to the top through one side in the horizontal direction with respect to the image forming unit 1e when viewed from the main scanning direction (the width direction of the sheet perpendicular to the transport direction of the sheet transported along the main transport path 1m) at the time of image formation.

In other words, the apparatus body 10 is a so-called vertical transport type (vertical path type) printer in which the main transport path 1m extends in a substantially vertical direction. When viewed in the vertical direction, the first discharge tray 13, the intermediate path 15, and the sheet cassette 8 overlap each other. Therefore, the moving direction of the sheet when the discharge unit 34 discharges the sheet P in the horizontal direction is opposite to the moving direction of the sheet when the sheet P is fed from the sheet cassette 8 in the horizontal direction.

Further, from the viewpoint of FIG. 1 (a view in the main scanning direction at the time of image formation), it is preferable that the horizontal occupied range of the main body portion of the post-processing unit 30 excluding the second discharge tray 35 fit into the occupied range of the apparatus body 10. By fitting the post-processing unit 30 in the space above the apparatus body 10 in this way, the image forming apparatus 1 having an adhesive printing function can be installed in about the same installation space as a normal vertical path printer.

Bonding Unit

Figure 2:
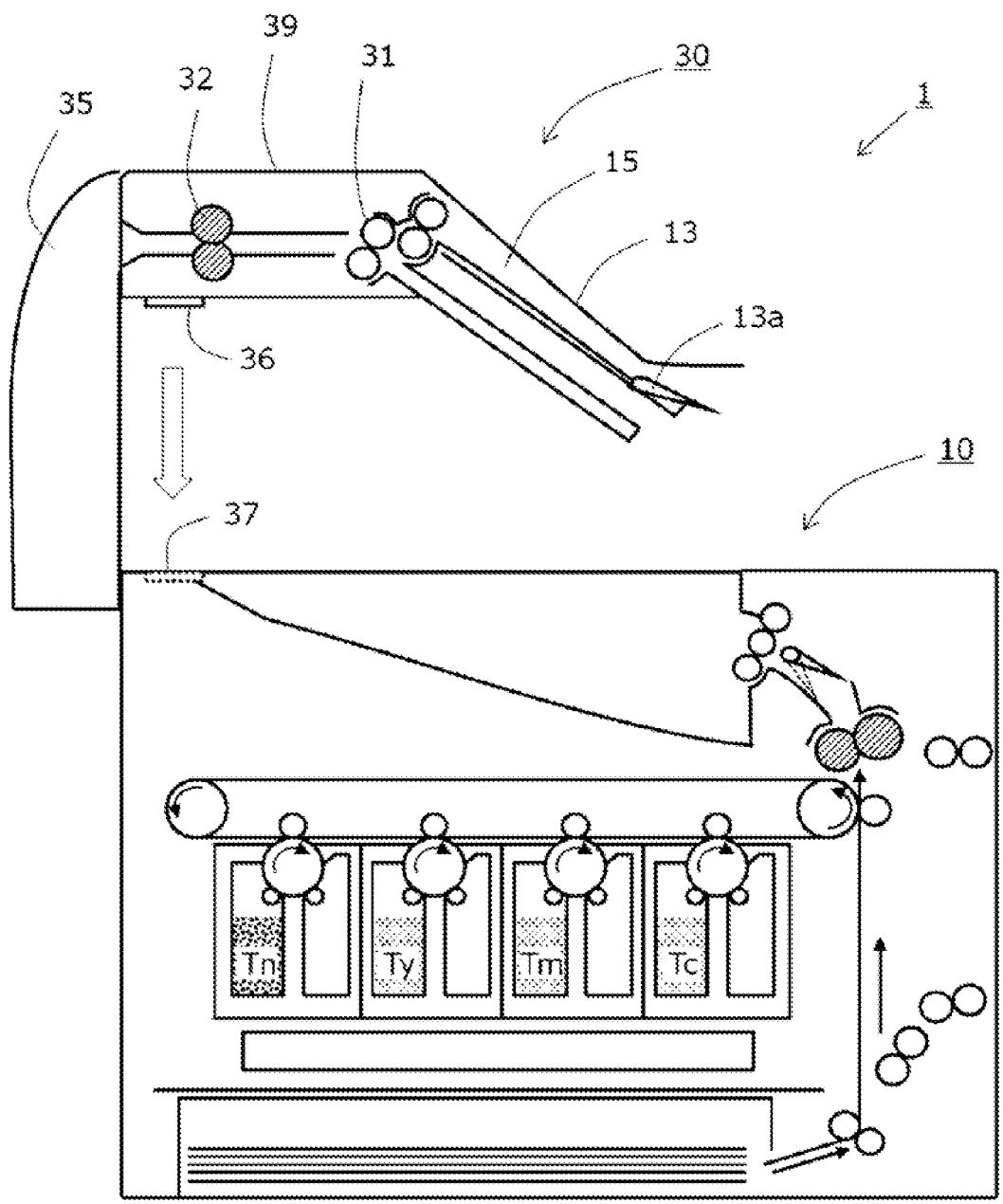
FIG. 2 is a diagram for explaining mounting of a bonding unit on the apparatus body of an image forming apparatus.

As shown in FIG. 2, the post-processing unit 30 is attached to the top of the apparatus body 10. In the post-processing unit 30, a folding device 31 as a folding means and the second fixing unit 32 as an adhesive bonding means (second fixing means) are accommodated in a housing (second housing) 39 and integrated.

Further, the post-processing unit 30 is provided with a first discharge tray 13 for rotatably holding the tray switching guide 13a, an intermediate path 15, and a second discharge tray 35. The first discharge tray 13 is provided on the upper surface of the post-processing unit 30, and is located on the top face (FIG. 1) of the entire image forming apparatus 1. The functions of each part included in the post-processing unit 30 will be described hereinbelow.

The post-processing unit 30 has a positioning portion (for example, a convex shape that engages with a concave portion of the housing 19) for positioning the housing 39 with respect to the housing 19 (first housing) of the apparatus body 10. Further, the post-processing unit 30 is provided with a drive source and a control unit separate from the apparatus body 10, and the connector 36 of the post-processing unit 30 and the connector 37 of the apparatus body 10 are joined together to electrically connect the post-processing unit to the apparatus body 10. As a result, the post-processing unit 30 is brought into an operating state based on a command from the control unit provided in the apparatus body 10 by using the electric power supplied through the apparatus body 10.

Process Cartridge

Figure 7:
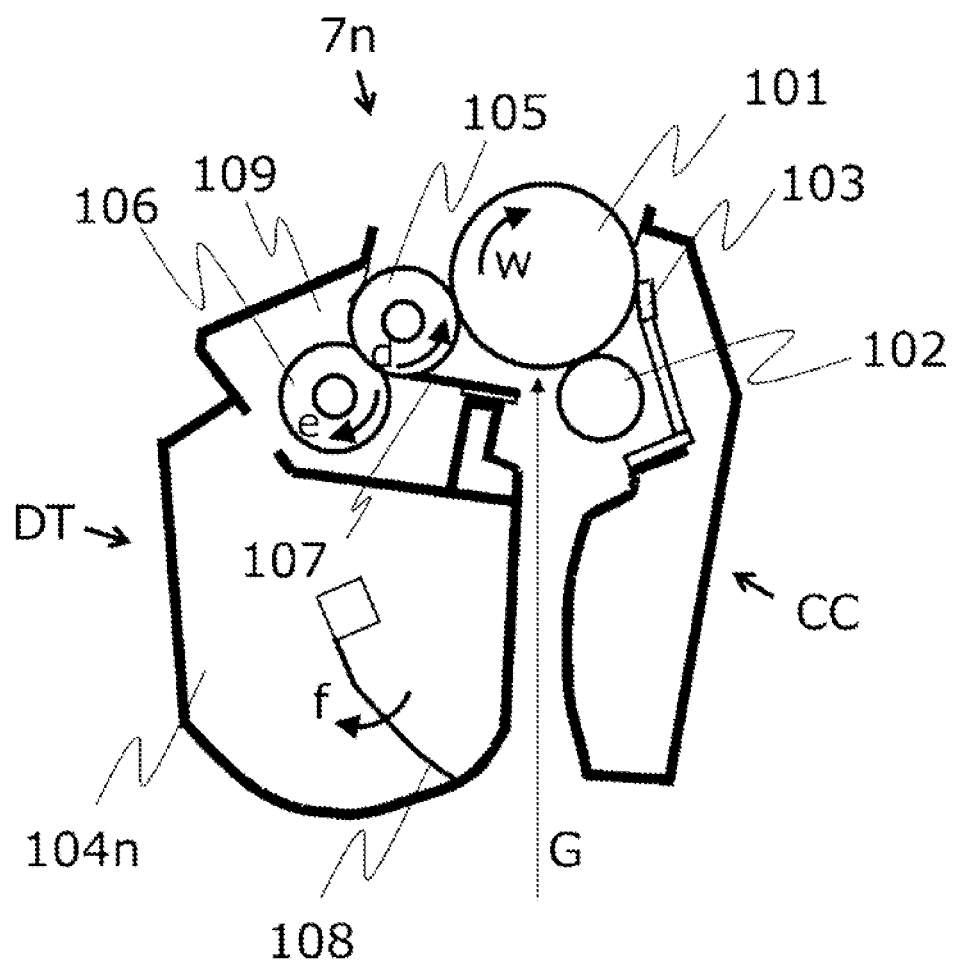
FIG. 7 is a schematic drawing of a process cartridge.

As described above, the process cartridges 7n, 7y, 7m, and 7c have substantially the same configuration except for the types of powders accommodated in the four powder accommodating portions 104n, 104y, 104m, and 104c. Here, the process cartridge 7n will be described as a representative cartridge. FIG. 7 is a schematic cross-sectional view of the process cartridge 7n. The process cartridge 7n includes a photosensitive member unit CC including a photosensitive drum 101 and the like, and a developing unit DT including a developing roller 105 and the like.

The photosensitive drum 101 is rotatably attached to the photosensitive member unit CC via a bearing (not shown). Further, the photosensitive drum 101 is rotationally driven in the clockwise direction (arrow w) in the figure according to the image forming operation by receiving the driving force of the drive motor as a driving means (driving source) (not shown). Further, in the photosensitive member unit CC, the charging roller 102 and a cleaning member 103 for charging the photosensitive drum 101 are arranged around the photosensitive drum 101.

The developing unit DT is provided with the developing roller 105 as a developer carrying member that comes into contact with the photosensitive drum 101 and rotates counterclockwise (arrow d) in the figure. The developing roller 105 and the photosensitive drum 101 rotate so that their surfaces move in the same direction at the facing portion (contact portion).

Further, a developer supply roller 106 (hereinafter, simply referred to as "supply roller") as a developer supply member that rotates in the clockwise direction (arrow e) in the drawing is arranged in the developing unit DT. The supply roller 106 and the developing roller 105 rotate so that their surfaces move in the same direction at the facing portion (contact portion).

The supply roller 106 acts to supply a powder adhesive (the printing toner in the case of process cartridges 7y, 7m, and 7c) onto the developing roller 105 and to peel off the powder adhesive (the printing toner in the case of process cartridges 7y, 7m, and 7c) remaining on the developing roller 105 from the developing roller 105.

Further, a developing blade 107 as a developer regulating member that regulates the layer thickness of the powder adhesive (the printing toner in the case of process cartridges 7y, 7m, and 7c) supplied on the developing roller 105 by the supply roller 106 is arranged in the developing unit DT.

The powder adhesive (the printing toner in the case of process cartridges 7y, 7m, and 7c) is stored as powder in the powder accommodating portion 104n. Further, a rotatably supported transport member 108 is provided in the powder accommodating portion 104n. A stirring member 108 rotates in the clockwise direction (arrow f) in the figure to stir the powder stored in the powder accommodating portion 104n and transports the powder to the developing chamber 109 provided with the developing roller 105 or the supply roller 106.

Here, the photosensitive member unit CC and the developing unit DT can also be configured as separate photoconductive unit cartridge and developing unit cartridge to enable detachable attachment thereof to the image forming apparatus body. Further, the units can also be configured as a powder cartridge that has only the powder accommodating portion 104 and the transport member 108 and is detachable from the apparatus body.

Image Forming Operations

Figure 3A:
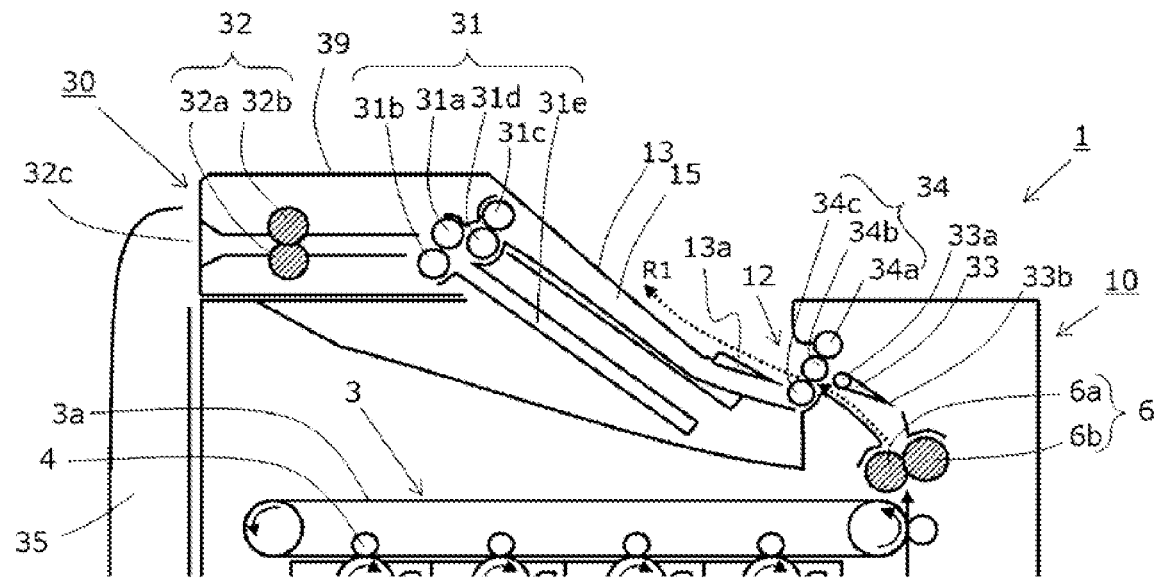
FIGS. 3A and 3B are diagrams illustrating transport paths of sheets in an image forming apparatus.
Figure 3B:
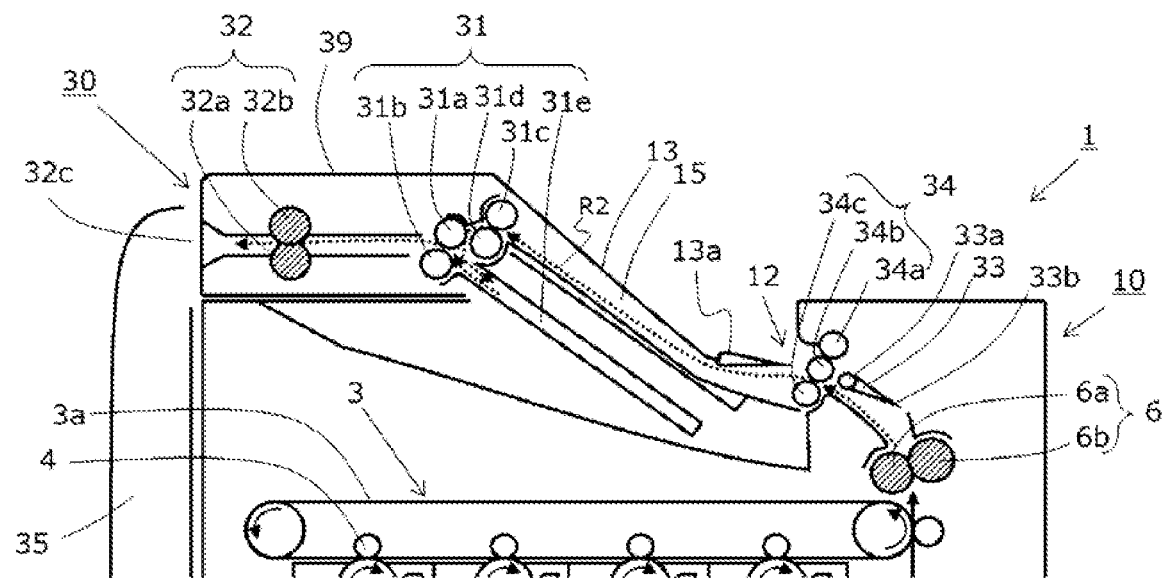
Figure 6A:
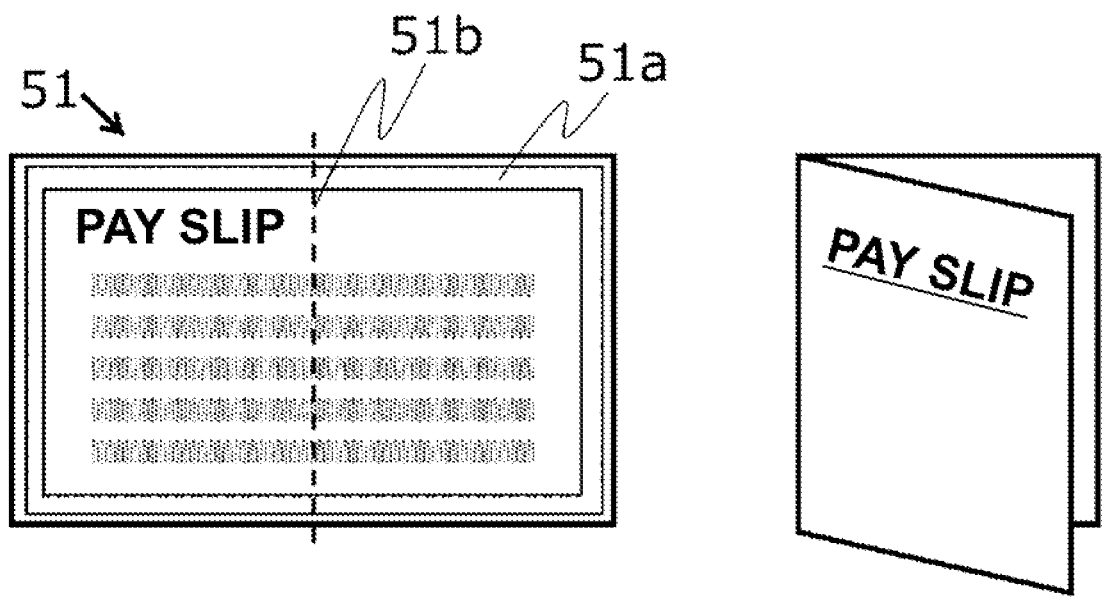
FIGS. 6A and 6B are diagrams illustrating a deliverable outputted by an image forming apparatus.
Figure 6B:
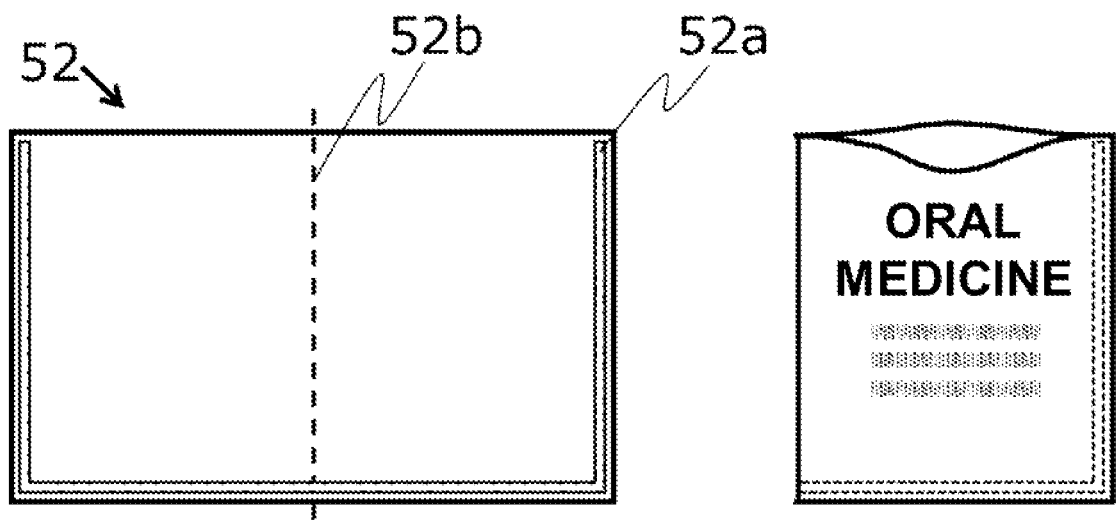

Next, the image forming operations performed by the image forming apparatus 1 will be described with reference to FIGS. 1 to 7. FIGS. 3A and 3B are diagrams illustrating a sheet transport path in the image forming apparatus 1. FIGS. 4A to 4F are diagrams for explaining the particulars of the folding process. FIGS. 6A and 6B are diagrams illustrating deliverable outputted by the image forming apparatus 1.

When image data to be printed and a print execution command are input to the image forming apparatus 1, the control unit of the image forming apparatus 1 starts a series of operations (image forming operations) for transporting the sheet P to form an image, and if necessary, for performing post-processing with the post-processing unit 30. In the image forming operations, first, as shown in FIG. 1, the sheets P are fed one by one from the sheet cassette 8 and transported toward the transfer nip 5n via the transport roller 8a.

The process cartridges 7n, 7y, 7m, and 7c are sequentially driven in parallel with the feeding of the sheet P, and the photosensitive drum 101 is rotationally driven in the clockwise direction (arrow w) in the figure. At this time, the photosensitive drum 101 is uniformly charged on the surface by the charging roller 102. Further, the scanner unit 2 irradiates the photosensitive drum 101 of each process cartridge 7n, 7y, 7m, and 7c with a laser beam G modulated based on the image data to form an electrostatic latent image on the surface of the photosensitive drum 101. Next, the electrostatic latent image on the photosensitive drum 101 is developed as a powder image by the powder borne on the developing rollers 105 of each process cartridge 7n, 7y, 7m, and 7c.

The powder adhesive layer formed by the powder adhesive Tn on the photosensitive drum 101 by the development is different from the toner image (normal toner image) of the printing toner for recording an image such as a figure and text on the sheet P in that the powder adhesive layer is not intended to transmit visual information. However, in the following description, the layer of the powder adhesive Tn formed in a shape corresponding to an application pattern by the electrophotographic process in order to apply the powder adhesive Tn to the sheet P in a predetermined application pattern is also handled as a "toner image".

The transfer belt 3a rotates in the counterclockwise direction (arrow v) in the figure. The toner image formed in the process cartridges 7n, 7y, 7m, and 7c is primarily transferred from the photosensitive drum 101 to the transfer belt 3a by the electric field formed between the photosensitive drum 101 and the primary transfer roller 4. The toner image that is borne on the transfer belt 3a and has reached the transfer nip 5n is secondarily transferred by the electric field formed between the secondary transfer roller 5 and the secondary transfer inner roller 3b to the sheet P that has been transported along the main transport path 1m.

After that, the sheet P is transported to the first fixing unit 6 to undergo heat fixing treatment. That is, when the sheet P passes through the fixing nip 6n, the toner image on the sheet P is heated and pressurized, so that the printing toners Ty, Tm, and Tc and the powder adhesive Tn are melted and then fixed, so that an image fixed to the sheet P is obtained. Regardless of whether single-sided printing or double-sided printing is performed, the sheet P discharged from the apparatus body 10 is nipped between the intermediate roller 34b and the second discharge roller 34c, as shown in FIGS. 3A and 3B, and is transported to the first route R1 or the second route R2 by the tray switching guide 13a.

In the first route R1 shown in FIG. 3A, the sheet P that has passed through the first fixing unit 6 is discharged to the first discharge tray 13 by the discharge unit 34 in the normal printing mode in which the post-processing unit 30 is not used. In the second route R2 shown in FIG. 3B, the sheet P that has passed through the first fixing unit 6 is discharged to the second discharge tray 35 through the discharge unit 34, the folding device 31, and the second fixing unit 32 in the adhesive printing mode.

An intermediate path 15 is provided between the first fixing unit 6 and the folding device 31 in the second route R2. The intermediate path 15 is a sheet transport path that passes through the upper surface portion (top surface portion) of the image forming apparatus 1 and extends substantially parallel to the first discharge tray 13 below the first discharge tray 13. The intermediate path 15 and the first discharge tray 13 are inclined upward in the vertical direction toward the folding device 31 in the horizontal direction. Therefore, the inlet of the folding device 31 (guide roller pair (31c and 31d) described hereinbelow) is located vertically above the outlet (the nip of the intermediate roller 34b and the second discharge roller 34c) of the apparatus body 10.

The folding device 31 has four rollers: a first guide roller 31c, a second guide roller 31d, a first folding roller 31a, and a second folding roller 31b, and a draw-in portion 31e. The first guide roller 31c and the second guide roller 31d are a pair of guide rollers that nip and transport the sheet P received from the transfer path (intermediate path 15 in the present embodiment) on the upstream side of the folding device 31. The first folding roller 31a and the second folding roller 31b are a pair of folding rollers that feed out the sheet P while bending the sheet.

A spacing M (FIG. 1) from the second discharge roller 34c to the first guide roller 31c in the sheet transport direction along the second route R2 is configured to be shorter than the total length L (FIG. 4A) of the sheet P in the transport direction before the folding process. In other words, the spacing M from the second discharge roller 34c to the first guide roller 31c determines the lower limit of the length of the sheet in the transport direction that can be processed by the post-processing unit 30. With this configuration, the sheet P is delivered from the discharge unit 34 to the guide roller pair without delay.

The folding process performed by the folding device 31 will be described with reference to FIGS. 4A to 4F. When the folding process is executed, the first guide roller 31c and the first folding roller 31a rotate clockwise in the figure, and the second guide roller 31d and the second folding roller 31b rotate counterclockwise in the figure.

Figure 4A:
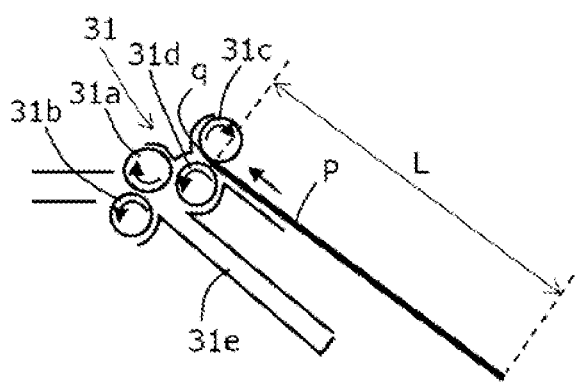
FIGS. 4A to 4F are diagrams for explaining the particulars of a folding process.

First, the front end q of the sheet P fed out from the discharge unit 34 is pulled into the guide roller pair (31c and 31d) as shown in FIG. 4A. As shown in FIG. 4B, the front end q of the sheet P is guided downward by the guide wall 31f, contacted with the first folding roller 31a, pulled between the first folding roller 31a and the second guide roller 31d facing each other, and brought into contact with the wall 31g of the draw-in portion 31e.

Figure 4D:
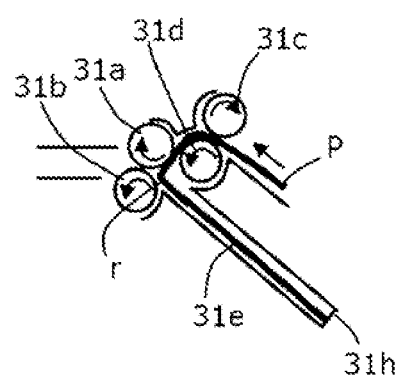
Figure 4B:
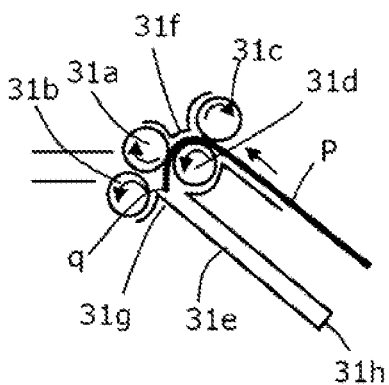
Figure 4E:
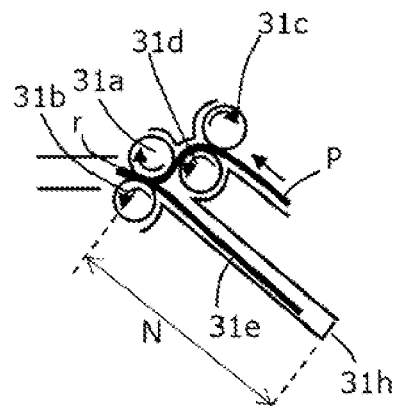
Figure 4C:
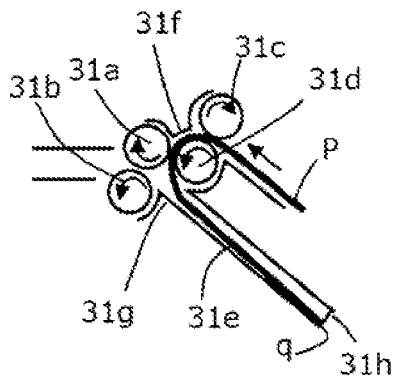
Figure 4F:
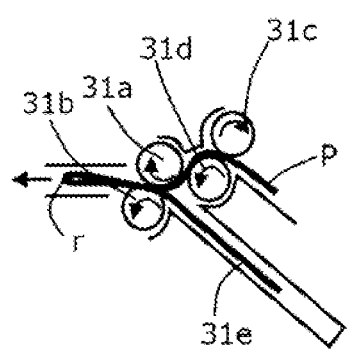

As the sheet P is pulled in by the guide roller pair (31c and 31d), the front end q advances to the back of the draw-in portion 31e while sliding in contact with the wall 31g. Eventually, the front end q abuts against an end portion 31h of the draw-in portion 31e as shown in FIG. 4C. The draw-in portion 31e forms a space extending substantially parallel to the intermediate path 15 below the intermediate path 15, and the sheet P is wound into a U-shaped bent state around the second guide roller 31d at the stage shown in FIG. 4C.

Where the sheet P is further pulled in by the guide roller pair (31c and 31d) from the state shown in FIG. 4C, deflection begins to occur in the middle portion r as shown in FIG. 4D. Eventually, as shown in FIG. 4E, the middle portion r comes into contact with the second folding roller 31b, thereby being pulled into the nip portion of the folding roller pair (31a and 31b) by the frictional force received from the second folding roller 31b. Then, as shown in FIG. 4F, the sheet P is discharged with the middle portion r at the front end by the folding roller pair (31a and 31b) in a state of being folded with the middle portion r as a crease.

Here, a depth N (FIG. 4E) of the draw-in portion 31e, that is, a distance from the nip portion of the folding roller pair (31a and 31b) to the end portion 31h of the draw-in portion 31e is set to the length which is half of the total length L of the sheet P. As a result, the folding device 31 can execute a process (middle folding) of folding the sheet P in half at half length. By changing the depth N of the draw-in portion 31e, the position of the crease can be arbitrarily changed.

The folding device 31 described above is an example of folding means, and for example, a folding mechanism that forms a crease by pressing a blade against the sheet P and pushing it into the nip portion of the roller pair may be used. Further, the contents of the folding process are not limited to folding in half, and for example, a folding mechanism that executes Z folding or tri-folding may be used.

Since the folding device 31 is configured of a rotating roller and a fixed draw-in portion 31e, the drive mechanism can be simplified as compared with a folding mechanism using a reciprocating blade. Further, since the folding device 31 may be provided with a draw-in portion 31e having a depth N of half the sheet length in addition to the four rollers, the post-processing unit 30 can be miniaturized.

The sheet P that has passed through the folding device 31 is transported to the second fixing unit 32 as shown in FIG. 3B. The second fixing unit 32 has a heat fixing configuration similar to the first fixing unit 6. That is, the second fixing unit 32 has a heat roller 32b as a heating member and a pressure roller 32a as a pressing member. The heat roller 32b is heated by a heat generating element such as a halogen lamp or a ceramic heater, or by a heating mechanism of induction heating type.

The pressure roller 32a is pressed against the heat roller 32a by an urging member such as a spring and generates a pressurizing force that pressurizes the sheet P passing through the nip portion (bonding nip) of the heat roller 32b and the pressure roller 32a.

The sheet P folded by the folding device 31 is bonded in the folded state by undergoing a bonding process (second heat fixing to the image surface coated with the powder adhesive Tn) by the second fixing unit 32. That is, when the sheet P passes through the bonding nip, the powder adhesive Tn on the sheet P is heated and pressurized in a remelted state, so as to adhere to the facing surface (in the folded state, the surface facing the image surface of the sheet P onto which the toner image of the powder adhesive Tn has been transferred). Then, when the powder adhesive Tn cools and hardens, the image surface and the facing surface of the sheet P are joined (bonded) using the powder adhesive Tn as an adhesive.

As shown in FIG. 3B, the sheet P that has undergone the bonding process by the second fixing unit 32 is discharged to the left side in the figure from the discharge port 32c (second discharge port) provided in the housing 39 of the post-processing unit 30. The sheet is then stored in the second discharge tray 35 (see FIG. 1) provided on the left side surface of the apparatus body 10. This completes the image forming operation when the sheet P is transported along the second route R2.

The joining location of the folded sheet P can be changed by the application pattern of the powder adhesive Tn on the sheet P. FIGS. 6A and 6B exemplify deliverables (output products of an image forming apparatus) having different application patterns of the powder adhesive Tn. FIG. 6A is an example of a deliverable (half-bonded product) to be opened by a recipient. In the case of a pay slip 51 shown in FIG. 6A, the powder adhesive Tn is applied to the entire circumference 51a of the outer peripheral portion of one side of the sheet P, and the sheet P is bonded in a folded state at the central crease 51b.

FIG. 6B shows a bag (medicine bag 52) as an example of a deliverable (completely bonded deliverable) for applications that do not presuppose the opening. In this case, the powder adhesive Tn is applied to a U-shaped region 52a so that the three sides including the crease 52b of the folded sheet P are joined. Although no image is formed inside the bag in FIG. 6B, an image can be formed if necessary.

Further, the image forming apparatus 1 can output any of the deliverables illustrated in FIGS. 6A and 6B in a one-stop manner without preparing preprint paper. That is, it is possible to apply the powder adhesive Tn in a predetermined application pattern and output the deliverables subjected to folding process and bonding process in parallel with the operation of recording an image on one side or both sides of the sheet P by using the printing toner.

For example, when the deliverables of FIGS. 6A and 6B are output, one side of the sheet P used as the base paper is on the outside of the deliverable, and the other side is on the inside of the deliverable. Therefore, an image for the outer surface may be formed with the printing toner as an image forming operation on the first surface in double-sided printing, and an image for the inner surface may be formed with the printing toner and the powder adhesive Tn may be applied according to the predetermined application pattern as an image forming operation on the second surface.

The image recorded by the image forming apparatus 1 using the printing toner can include a format (unchanged portion) when using preprint paper and a variable portion such as personal information. Therefore, it is possible to output the deliverable bonded by the bonding process from the base paper such as blank paper which is not the preprinted paper as described above. However, the image forming apparatus 1 can also be used in applications in which the preprinted paper is used as a recording medium and the printing process and bonding process of the variable portion are performed.

Method for Producing Bonded Article (Product)

The method for producing a bonded article is a method for producing a bonded article in which at least one sheet of paper is bonded via a bonding region using the hot-melt adhesive, and preferably has a bonding region formation step of developing the bonding region on the paper using the hot-melt adhesive and fixing the bonding region by heating, and a bonding step, subsequent to a formation of the bonding region, of obtaining the bonded article by overlaying the paper so as to sandwich a formed bonding region, by heating, and by bonding the paper by melting the bonding region, wherein the temperature $Tf$ (° C.) of the fixing unit during the heating and a melting point $Tm$ (° C.) of the hot-melt adhesive satisfy $70 \leq Tf - Tm \leq 200$.

In addition, the bonded article may have, on at least one side of the paper, an image region provided by an electrophotographic developer, and the method for producing a bonded article may have a step of forming an image region and a bonding region, in which on at least one side of the paper an image region is developed by an electrophotographic developer and a bonding region is developed by a hot-melt adhesive, and in which the image region and bonding region are fixed by the application of heat. After the formation of the image region and bonding region, preferably the paper is overlaid with the resulting bonding region becoming sandwiched and heating is carried out as described above.

The bonded product may be in the form obtained by folding and bonding one sheet of paper via an adhesive portion, or in the form obtained by bonding two sheets of paper via an adhesive portion. The bonded product has, for example, a booklet, bag-like, tubular form and the like. When paper is bonded via an adhesive portion, the surface on which the adhesive portion is present will be present on two surfaces in the bonded product, but the adhesive portion formed by the powder adhesive may be formed on at least one of the two surfaces. In a case where the bonded product is produced from a single sheet of paper, the toner image portion of toner and the adhesive portion of the powder adhesive may be formed on at least one of the surfaces of the paper. A toner image portion may or may not be formed on the other surface of the paper.

In a case where two sheets of paper are bonded together to produce a bonded product, a toner image portion and an adhesive portion may be formed on one of the paper sheets. A toner image portion or an adhesive portion may or may not be formed on the other paper sheet. Either the toner image portion or the adhesive portion may be formed first; alternatively, both the toner image portion and the adhesive portion may be formed simultaneously. Forming and fixing of the image portion and forming and fixing of the adhesive portion can be performed for instance using the above-described image forming apparatus. A known electrophotographic method can be resorted to.

After the toner image portion and the adhesive portion have been formed, in the case of one sheet of paper, the paper is folded to sandwich the adhesive portion, and in the case of two sheets of paper, these are overlaid to sandwich the adhesive portion. Then, the paper is bonded by heating to melt the adhesive portion, and a bonded product (deliverable) is obtained. Such a bonding step can be performed by using, for example, the above-mentioned image forming apparatus or the above-mentioned fixing unit of the sheet processing device.

The temperature Tf (° C.) of the fixing unit during heating and the melting point Tm (° C.) of the hot-melt adhesive preferably satisfy 70≤Tf−Tm≤200. By establishing 70≤Tf−Tm, the hot-melt adhesive can be satisfactorily melted, and a high adhesive strength can then be obtained. By establishing Tf−Tm≤200, the occurrence of the phenomenon of removal of the hot-melt adhesive by the fixing unit (so-called hot offset) can be impeded and due to this a high adhesive strength can be obtained. The temperature Tf of the fixing unit denotes the surface temperature of the heating member with which the fixing unit is equipped. Tf and Tm more preferably satisfy 80≤Tf−Tm≤180 and still more preferably satisfy 100≤Tf−Tm≤160.

Bonded Article

The hot-melt adhesive described in the preceding can be used as the adhesive in a bonded article in which at least one piece of paper is bonded with an adhesive. This adhesive is the melted and hardened material from the hot-melt adhesive. There are no particular limitations on the means of obtaining the bonded article. The hot-melt adhesive may be applied to a desired region on a sheet of folded paper or between a plurality of sheets of paper that are overlaid, and heat and optionally pressure may be applied. Alternatively, paper having a bonding region may be obtained by loading the hot-melt adhesive at a desired location on paper and fixing the hot-melt adhesive onto the paper by the application of heat and optionally pressure. A bonded article may also be obtained by folding a bonding region-bearing paper, or stacking a bonding region-bearing paper with another paper, and applying heat and optionally pressure.

There are no particular limitations on the means for applying heat and optionally pressure. For example, a hot plate or a laminator may be used. The fixing process used in electrophotographic systems may be employed. The developing process and fixing process used in electrophotographic systems may also be adopted when a bonding region is to be formed on paper.

The adhesive strength per 1 cm$^2$ when the bonded article is peeled is preferably 0.5 N/cm$^2$ to 2.5 N/cm$^2$, more preferably 1.0 N/cm$^2$ to 2.5 N/cm$^2$, and particularly preferably 1.3 N/cm$^2$ to 2.5 N/cm$^2$. Measurement of the adhesive strength can be carried out using an RTG-1225 Tensilon Universal Tester (A & D Company, Limited) by the methods described below in (Evaluation Sample Fabrication) and (Evaluation of Adhesive Strength).

The methods for measuring the individual properties are described in the following.

Identification of Molecular Structure of Thermoplastic Resin and Crystalline Material, Method for Measuring Content of Thermoplastic Resin Incorporated in Hot-Melt Adhesive, and Method for Measuring Content of Crystalline Material Incorporated in Hot-Melt Adhesive. Pyrolysis gas chromatography-mass spectrometry (pyrolysis GC/MS in the following) and NMR are used to identify the molecular structure of the thermoplastic resin and crystalline material, measure the content of the thermoplastic resin incorporated in the hot-melt adhesive, and measure the content of the wax incorporated in the hot-melt adhesive. In pyrolysis GC/MS, it is possible to determine the monomers that make up the total amount of resin in a sample and determine the peak area of each monomer, but for quantification, the peak intensity of a sample with a known concentration as a reference needs to be standardized. Meanwhile, in NMR, it is possible to determine and quantify the constituent monomers without using a sample having a known concentration. Therefore, depending on the situation, the constituent monomers are determined by comparing the spectra of both NMR and pyrolysis GC/MS.

Specifically, when the amount of the resin component insoluble in deuterated chloroform, which is an extraction solvent at the time of NMR measurement, is less than 5.0% by mass, quantification is performed by NMR measurement.

Meanwhile, when the resin component insoluble in deuterated chloroform, which is an extraction solvent at the time of NMR measurement, is present in an amount of 5.0% by mass or more, NMR and pyrolysis GC/MS measurements are performed, and pyrolysis GC/MS measurement is performed for deuterated chloroform insoluble matter. In this case, first, NMR measurement is performed for deuterated chloroform soluble matter to determine and quantify the constituent monomers (quantification result 1). Next, pyrolysis GC/MS measurement is performed on the deuterated chloroform soluble matter, and the peak area of the peak attributed to each constituent monomer is determined. Using the quantification result 1 obtained by NMR measurement, the relationship between the amount of each constituent monomer and the peak area of pyrolysis GC/MS is determined.

Next, pyrolysis GC/MS measurement of deuterated chloroform insoluble matter is performed, and the peak area of the peak attributed to each constituent monomer is determined. Based on the relationship between the amount of each constituent monomer obtained by measuring the deuterated chloroform soluble matter and the peak area of pyrolysis GC/MS, the constituent monomer in deuterated chloroform insoluble matter is quantified (quantification result 2). Then, the quantification result 1 and the quantification result 2 are combined to obtain the final quantification result of each constituent monomer. Specifically, the following operations are performed.

(1) A total of 50 mg of hot-melt adhesive is precisely weighed in an 8 mL glass sample bottle, 1 mL of deuterated chloroform is added, a lid is closed, and the components are dispersed and dissolved by an ultrasonic disperser for 1 h. Then, filtration is performed with a membrane filter having a pore diameter of 0.4 μm and the filtrate is collected. At this time, the deuterated chloroform insoluble matter remains on the membrane filter.

(2) $^1$H-NMR measurement is performed on the filtrate, and the spectrum is attributed to each constituent monomer in the resin to obtain a quantitative value.

(3) Where the deuterated chloroform insoluble matter needs to be analyzed, it is analyzed by pyrolysis GC/MS. If necessary, derivatization treatment such as methylation is performed.

NMR Measurement Conditions

Bruker AVANCE 500 manufactured by Bruker Biospin Co., Ltd.

Measurement nucleus: $^1$H.

Measurement frequency: 500.1 MHz.

Accumulation number: 16 times.

Measurement temperature: room temperature.

Measurement Conditions for Pyrolysis GC/MS

Pyrolysis device: TPS-700 manufactured by Nippon Analytical Industry Co., Ltd.

Pyrolysis temperature: appropriate value from 400° C. to 600° C.

GC/MS device: ISQ manufactured by Thermo Fisher Scientific Co., Ltd.

Column: "HP5-MS" (Agilent/19091S-433), length 30 m, inner diameter 0.25 mm, membrane thickness 0.25 µm.

GC/MS conditions.

Inlet Conditions:

InletTemp: 250° C.

SpiritFlow: 50 mL/min.

GC temperature rise condition: 40° C. (5 min)→10° C./min (300° C.)→300° C. (20 min).

In addition, when results are obtained that suggest that the thermoplastic resin contains a plurality of components, the hot-melt adhesive is dissolved in THF and the solvent is distilled off under reduced pressure from the obtained soluble matter to yield the THF-soluble matter of the hot-melt adhesive. The obtained THF-soluble matter from the hot-melt adhesive is dissolved in chloroform to prepare a sample solution with a concentration of 25 mg/mL. 3.5 mL of the obtained sample solution is injected into the instrument described below and is fractionated as follows using the conditions described below: component with a number-average molecular weight (Mn) less than 2,000, greater than or equal to 2,000 and less than 5,000, greater than or equal to 5,000 and less than 10,000, greater than or equal to 10,000 and less than 30,000, and greater than or equal to 30,000.

Preparative GPC instrument: Model LC-980 preparative HPLC, Japan Analytical Industry Co., Ltd.

Preparative column: JAIGEL 3H, JAIGEL 5H (Japan Analytical Industry Co., Ltd.)

Eluent: chloroform

Flow rate: 3.5 mL/min

A molecular weight calibration curve constructed using polystyrene resin standards (for example, product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample.

After fractionation of the individual components, the solvent is removed by distillation under reduced pressure and the solid is fractionated by recrystallization from acetone and is dried for 24 hours under reduced pressure in a 90° C. atmosphere. This procedure is repeated until about 100 mg of each component is respectively obtained. Each of the obtained components is analyzed using the identification procedure described above and the structure of each thermoplastic resin is identified and the content is determined.

Method for Measuring Tc and Tm

Tc and Tm are measured using a "Q1000" differential scanning calorimeter (TA Instruments). Temperature correction in the instrument detection section is performed using the melting points of indium and zinc, and the amount of heat is corrected using the heat of fusion of indium. In specific terms, 1 mg of the hot-melt adhesive is exactly weighed out and this is introduced into an aluminum pan; an empty aluminum pan is used for reference. Heating from 0° C. to 150° C. is carried out at a temperature increasing rate of 10° C./min, and 150° C. is maintained for 5 minutes. This is followed by cooling from 150° C. to 0° C. at a temperature reduction rate of 10° C./min. Tc (° C.) is assigned to a peak temperature of the highest peak of exothermic peaks produced during this temperature reduction process. Then, after maintenance at 0° C. for 5 minutes, heating is carried out from 0° C. to 150° C. at a temperature increasing rate of 10° C./min. Tm (° C.) is assigned to a peak temperature of the highest peak of endothermic peaks produced in the DSC curve during this process.

Method for Measuring the Glass Transition Temperature (Tg)

The glass transition temperature (Tg) of a resin such as thermoplastic resin and so forth is measured using a "Q1000" differential scanning calorimeter (TA Instruments). The melting points of indium and zinc are used for temperature correction in the instrument detection section, and the heat of fusion of indium is used for correction of the amount of heat. Specifically, 1 mg of the sample is exactly weighed out and introduced into an aluminum pan; an empty aluminum pan is used for reference. Using modulation measurement mode, measurement is carried out in the range from 0° C. to 100° C. at a temperature increasing rate of 1° C./minute and a temperature modulation condition of ±0.6° C./60 s. Because a change in the specific heat is obtained during the temperature increasing process, the glass transition temperature (Tg) is taken to be the point at the intersection between the differential heat curve and the line for the midpoint for the baselines for prior to and subsequent to the appearance of the change in the specific heat.

Method for Measuring Mw, Mp, and Mn Molecular Weights

The molecular weight of the THF-soluble matter of the hot-melt adhesive is measured using gel permeation chromatography (GPC) as follows.

First, the measurement sample is dissolved in tetrahydrofuran (THF). The obtained solution is filtered using a "Sample Pretreatment Cartridge" (Tosoh Corporation) solvent-resistant membrane filter having a pore diameter of 0.2 µm to obtain a sample solution. The sample solution is adjusted to a concentration of THF-soluble component of 0.8 mass %. Measurement is carried out under the following conditions using this sample solution.

Instrument: "HLC-8220GPC" high-performance GPC instrument [Tosoh Corporation]

Column: 2×LF-604 [Showa Denko Kabushiki Kaisha]

Eluent: THF

Flow rate: 0.6 mL/min

Oven temperature: 40° C.

Sample injection amount: 0.020 mL

A molecular weight calibration curve constructed using polystyrene resin standards (for example, product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample. Mw, Mp and Mn are calculated from the obtained molecular weight distribution with attached analysis software.

Method for Measuring Degree of Compatibilization of Thermoplastic Resin and Crystalline Material Measurement by differential scanning calorimetry (DSC) is used to measure the degree of compatibilization A and the degree of compatibilization B. Resin provided by mixing the thermoplastic resin and crystalline material is used as the sample.

Production of Thermoplastic Resin

It is difficult to isolate only the thermoplastic resin when a hot-melt adhesive has been produced by the suspension polymerization method. As a consequence, when this material can be acquired in pure form, this may be used, while it is separately produced when it cannot be acquired in pure form. In specific terms, when the hot-melt adhesive has been produced by the suspension polymerization method, a resin is produced using only the monomer constituting the hot-melt adhesive and using the same polymerization temperature and the same polymerization initiator in the same amount as in the production conditions for the hot-melt adhesive; this resin is used as the thermoplastic resin.

Production of Mixed Resin in Which Thermoplastic Resin and Crystalline Material Resin Are Mixed The thermoplastic resin and crystalline resin (first crystalline material or second crystalline material) are dissolved in 2 mL of toluene at a mass ratio C or D to produce a homogeneous solution with heating as necessary. This solution is heated to 120° C. in a rotary evaporator and the pressure is gradually reduced so as to avoid bumping. The mixed resin (mixed resin A or B) is the product provided by reducing the pressure to 50 mbar and drying for 2 hours.

Measurement of Degree of Compatibilization

The degree of compatibilization A and the degree of compatibilization B are measured in accordance with ASTM D3418-82 using a "Q1000" differential scanning calorimeter (TA Instruments). Temperature correction in the instrument detection section is performed using the melting points of indium and zinc, and the amount of heat is corrected using the heat of fusion of indium. In specific terms, 2 mg of the mixed resin is exactly weighed out and is introduced into an aluminum pan; an empty aluminum pan is used as reference. Heating is carried out at a temperature increasing rate of 10° C./min in the temperature range from 0° C. to 100° C. After holding for 15 minutes at 100° C., cooling is carried out at a temperature reduction rate of 10° C./min between 100° C. and 0° C. The exothermic value ΔH (J/g) of the exothermic peak in the exothermic curve during this cooling process is measured.

The degrees of compatibilization A and B are calculated using the following formulas.

$$\text{degree of compatibilization } A\ (\%) = 100 - (100 \times \Delta H(A))/(\Delta H(C) \times C/100) \quad (1)$$

ΔH(A) represents an exothermic value (J/g), according to differential scanning calorimetric measurement, of exothermic peaks for the mixed resin A of the thermoplastic resin and the first crystalline material. ΔH(C) represents an exothermic value (J/g), according to differential scanning calorimetric measurement, of exothermic peaks of the first crystalline material. C represents a mass ratio (%) of the first crystalline material in the mixed resin A.

$$\text{degree of compatibilization } B\ (\%) = 100 - (100 \times \Delta H(B))/(\Delta H(C2) \times D/100) \quad (2)$$

ΔH(B) represents an exothermic value (J/g), according to differential scanning calorimetric measurement, of exothermic peaks for the mixed resin B of the thermoplastic resin and the second crystalline material. ΔH(C2) represents an exothermic value (J/g), according to differential scanning calorimetric measurement, of exothermic peaks of the second crystalline material. D represents a mass ratio (%) of the second crystalline material in the mixed resin B.

Method for Measuring THF-Insoluble Matter

The following measurement is performed to determine the content of THF-insoluble matter that is not extracted by Soxhlet extraction of the hot-melt adhesive for 16 hours using tetrahydrofuran (THF). 1.0 g of the hot-melt adhesive (W1, g) is weighed out and is introduced into a preweighed extraction thimble (product name: No. 86R, size 28×100 mm, Advantec Toyo Kaisha, Ltd.), and this is then set into a Soxhlet extractor. Extraction is carried out for 16 hours using 200 mL of tetrahydrofuran (THF) as solvent. The extraction is run at a reflux rate such that the solvent extraction cycle is once in about every 5 minutes.

After the completion of the extraction, the thimble is removed and is air dried, followed by vacuum drying for 8 hours at 40° C. and weighing the mass of the thimble including the extraction residue, and the mass of the extraction thimble is subtracted to determine the mass of the extraction residue (W2, g). The THF-insoluble matter can be determined by subtracting, as shown in the following formula (6), the content (W3, g) of the components other than the resin component.

$$\text{THF-insoluble matter(mass \%)} = \{(W2-W3)/(W1-W3)\} \times 100 \quad (6)$$

The content of the components other than the resin component can be measured using known analytic procedures. When analysis is problematic, the content (incineration residual ash (W3', g) in the hot-melt adhesive) of components other than the resin component can be estimated proceeding as follows and the THF-insoluble matter can be determined by subtracting this content. The incineration residual ash in the hot-melt adhesive is determined using the following procedure. Approximately 2 g of the hot-melt adhesive is weighed (Wa, g) into a preweighed 30-mL magnetic crucible. The crucible is introduced into an electric furnace and is heated for approximately 3 hours at approximately 900° C. and is allowed to cool in the electric oven and is allowed to cool for at least one hour in a desiccator at normal temperature. The mass of the crucible containing the incineration residual ash is weighed and the incineration residual ash (Wb, g) is calculated by subtracting the mass of the crucible. The mass (W3', g) of the incineration residual ash in the sample W1, g is calculated using the following formula (7).

$$W3' = W1 \times (Wb/Wa) \quad (7)$$

The THF-insoluble matter is determined in this case using the following formula (8).

$$\text{THF-insoluble matter(mass \%)} = \{(W2-W3')/(W1-W3')\} \times 100 \quad (8)$$

Method for Measuring Viscosity at 100° C.

The viscosity of the hot-melt adhesive at 100° C. according to measurement with a capillary rheometer operating on the constant load extrusion principle is measured using the following method. The measurement is carried out using a "Flowtester CFT-500D Flow Property Evaluation Instrument" (Shimadzu Corporation), which is a capillary rheometer operating on the constant load extrusion principle, in accordance with the manual provided with the instrument. With this instrument, while a constant load is applied by a piston from the top of the measurement sample, the measurement sample filled in a cylinder is heated and melted and the melted measurement sample is extruded from a die at the bottom of the cylinder; the relationship between piston stroke and temperature is measured during this process.

The measurement is performed at 50° C. to 200° C., and the apparent viscosity determined at 100° C. is taken to be the viscosity (Pa s) of the hot-melt adhesive at 100° C. The apparent viscosity η(Pa·s) at 100° C. is determined as follows. First, the flow rate Q (cm$^3$/s) is calculated from the following formula (9). In the formula, A (cm$^2$) is the cross-sectional area of the piston and Δt (s) is the time required for the piston to descend from between 0.10 mm above to 0.10 mm below (0.20 mm as the distance) with reference to the position of the piston at the 100° C. time point.

$$Q=(0.20\times A)/(10\times\Delta t) \quad (9)$$

The apparent viscosity at 100° C. is calculated with the following formula (10) using the obtained flow rate Q. In the formula, P (Pa) is the piston load, B (mm) is the diameter of the die orifice, and L (mm) is the length of the die.

$$\eta=(\pi\lambda B^4\lambda P)/(128000\times L\times Q) \quad (10)$$

The used measurement sample is prepared by subjecting 1.0 g of the hot-melt adhesive to compression molding for 60 seconds at 10 MPa in a 25° C. environment using a tablet compression molder (for example, NT-100H, NPa System Co., Ltd.) to provide a cylindrical shape with a diameter of approximately 8 mm. The measurement conditions with the CFT-500D are as follows.
Test mode: temperature increasing method
Start temperature: 50° C.
Saturated temperature: 200° C.
Measurement interval: 1.0° C.
Ramp rate: 4.0° C./min
Piston cross section area: 1.000 cm$^2$
Test load (piston load): 10.0 kgf (0.9807 MPa)
Preheating time: 300 seconds
Diameter of die orifice: 1.0 mm
Die length: 1.0 mm Method for Measuring the Weight-Average Particle Diameter (D4) of the Hot-melt Adhesive The weight-average particle diameter (D4) is determined proceeding as follows. The measurement instrument used is a "Coulter Counter Multisizer 3" (registered trademark, Beckman Coulter, Inc.), a precision particle size distribution measurement instrument operating on the pore electrical resistance method and equipped with a 100 μm aperture tube. The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels. The aqueous electrolyte solution used for the measurements is prepared by dissolving special-grade sodium chloride in deionized water to provide a concentration of 1.0% and, for example, "ISOTON II" (Beckman Coulter, Inc.) can be used.

The dedicated software is configured as follows prior to the execution of measurement and analysis. In the "modify the standard operating method (SOMME)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1,600 μA; the gain is set to 2; the electrolyte solution is set to ISOTON II; and a check is entered for the "post-measurement aperture tube flush". In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm. The specific measurement procedure is as follows.

(1) 200.0 mL of the aqueous electrolyte solution is introduced into a 250 mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30.0 mL of the aqueous electrolyte solution is introduced into a 100 mL flatbottom glass beaker. To this is added as dispersing agent 0.3 mL of a dilution prepared by the three-fold (mass) dilution with deionized water of "Contaminon N" (a 10% aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2.0 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the measurement sample is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the aqueous electrolyte solution prepared in (5) and containing dispersed toner particles, is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) is calculated. When set to graph/volume % with the dedicated software, the "average diameter" on the "analysis/volumetric statistical value (arithmetic average)" screen is the weight-average particle diameter (D4).

EXAMPLES

The present invention is specifically described in the following using examples, but the present invention is not limited to or by these examples. The parts in the examples is on a mass basis unless specifically indicated otherwise.

Crystalline Material 1 Production Example 312.9 g (1.1 mol) of stearic acid and 31 g (0.5 mol) of ethylene glycol were introduced into a four-neck flask fitted with a thermometer, nitrogen introduction line, stirrer, and condenser, and a reaction was run under a nitrogen current at 180° C. and normal pressure for 15 hours while distilling out the water produced by the reaction. 20 parts toluene and 4 parts ethanol were added per 100 parts of the crude esterification product yielded by this reaction; also added was a 10% aqueous potassium hydroxide solution that contained potassium hydroxide in an amount corresponding to 1.5 equivalents with reference to the acid value of the crude esterification production; and stirring was carried out for 30 minutes at 70° C. After standing at quiescence for 30 minutes after stirring, the crude esterification product was washed with water by removing the aqueous phase (lower layer) that had separated from the ester phase. This water wash was carried out four times until the pH of the aqueous phase reached 7. The solvent was then distilled from the water-washed ester phase at 180° C. and a reduced pressure condition of 1 kPa, and filtration was carried out to yield crystalline material 1 (ethylene glycol distearate). A distinct exothermic peak and a distinct endothermic peak were observed when the obtained crystalline material was subjected to differential scanning calorimetric measurement as the pure material, thus confirming the presence of crystallinity. The measured melting point is given in Table 1.

TABLE 1

| | Composition, product name | Production | Melting point of pure material (° C.) |
|---|---|---|---|
| Crystalline material 1 | Ethylene glycol distearate | Refer to production example | 76 |
| Crystalline material 2 | Aluminum Stearate 900 | NOF Corporation | 105 |
| Crystalline material 3 | Zinc Stearate GP | NOF Corporation | 120 |
| Crystalline material 4 | Stearyl stearate Unister M-9676 | NOF Corporation | 55 |
| Crystalline material 5 | Cetyl myristate Spermaceti | NOF Corporation | 48 |
| Crystalline material 6 | Paraffin wax HNP-51 | Nippon Seiro Co., Ltd. | 78 |
| Crystalline material 7 | Paraffin wax HNP-9 | Nippon Seiro Co., Ltd. | 75 |
| Crystalline material 8 | Microcrystalline wax Hi-Mic-1080 | Nippon Seiro Co., Ltd. | 83 |
| Crystalline material 9 | Microcrystalline wax Hi-Mic-1045 | Nippon Seiro Co., Ltd. | 70 |

Crystalline Materials 2 to 9

The composition and properties of the crystalline materials 2 to 9 used in the examples and comparative examples are given in Table 1.

Production Example of a Polyester Resin

Into a reaction vessel equipped with a stirrer, a thermometer, a nitrogen introduction tube, a dewatering tube and a pressure-reducing device there were added 1.00 mol of terephthalic acid, 0.65 mol of a propylene oxide 2 mol adduct of bisphenol A, and 0.35 mol of ethylene glycol, in molar ratio, as monomers, with heating up to a temperature of 130° C. while under stirring. Thereafter, 0.52 parts of tin(II) 2-ethylhexanoate as an esterification catalyst were added to 100.00 parts of the above monomers, the temperature was raised to 200° C., and condensation polymerization was carried out up to a desired molecular weight. Further, 3.00 parts of trimellitic anhydride were added to 100.00 parts of the above monomer mixture, to obtain a polyester resin. The obtained polyester resin had a peak molecular weight of 12,000, a glass transition temperature (Tg) of 75° C.

Hot-Melt Adhesive 1 Production Example

| | |
|---|---|
| styrene : | 75.0 parts |
| n-butyl acrylate : | 25.0 parts |
| polyester resin : | 4.0 parts |
| first crystalline material: crystalline material 1: | 14.0 parts |
| second crystalline material: crystalline material 6: | 2.0 parts |
| divinylbenzene : | 0.5 parts |

A mixture resulting from mixing the above materials was kept at 60° C., and was stirred at 500 rpm using T. K. Homomixer (by Tokushu Kika Kogyo Co., Ltd.), to elicit uniform dissolution and prepare a polymerizable monomer composition. Meanwhile, 850.0 parts of a 0.10 mol/L-$Na_3PO_4$ aqueous solution and 8.0 parts of 10% hydrochloric acid were added into a vessel provided with a high-speed stirring device CLEARMIX (by M Technique Co. Ltd.), the revolutions were adjusted to 15,000 rpm, and the temperature was raised to 70° C. Then 127.5 parts of a 1.0 mol/L-$CaCl_2$) aqueous solution were added thereto, to prepare an aqueous medium that contained a calcium phosphate compound.

The above polymerizable monomer composition was charged into the aqueous medium, followed by addition of 7.0 parts of t-butyl peroxypivalate as a polymerization initiator, and granulation for 10 minutes while keeping revolutions at 15,000 rpm/min. Thereafter, the stirrer was changed from a high-speed stirrer to a propeller stirring blade, and the reaction was carried out at 70° C. for 5 hours while under reflux, after which the liquid temperature was adjusted to 85° C., and the reaction was left to proceed for a further 2 hours. After the completion of the polymerization reaction, a heat-treatment process was carried out by heating the slurry to 100° C. and holding for 60 minutes. This was followed by a rapid cooling process in which rapid cooling was carried out from 100° C. to 40° C. at a cooling rate of 4° C./sec by passage through a Model KSH-1 spiral heat exchanger (Kurose Chemical Equipment Co., Ltd.).

The pH of the slurry yielded by rapid cooling was brought to 1.4 by the addition of hydrochloric acid and the calcium phosphate salt was dissolved by stirring for 1 hour. The slurry was then washed with three-fold amount of water followed by filtration, drying, and classification to yield powder adhesive particles. 2.0 parts of silica fine particles (number-average primary particle diameter: 10 nm, BET specific surface area: 170 $m^2$/g) hydrophobed using dimethylsilicone oil (20 mass %) was added as an external additive to 100.0 parts of the powder adhesive particles, and mixing for 15 minutes at 3,000 rpm using a Mitsui Henschel mixer (Mitsui Miike Chemical Engineering Machinery Co., Ltd.) yielded hot-melt adhesive 1 having a weight-average particle diameter of 6.5 μm. The properties of the resulting hot-melt adhesive are given in Table 3.

Production Example for Hot-Melt Adhesives 2 to 25 and Comparative Hot-Melt Adhesives 1 to 4

Hot-melt adhesives 2 to 25 and comparative hot-melt adhesives 1 to 4 were obtained proceeding as in the Hot-Melt Adhesive 1 Production Example, but changing the reaction conditions, type of crystalline material, and amount of crystalline material addition as shown in Table 2-1 and 2-2. The properties of the resulting hot-melt adhesives are given in Table 3.

TABLE 2-1

|  | First crystalline material | | Second crystalline material | | |
|---|---|---|---|---|---|
|  | Type | Amount of addition (parts) | Type | Amount of addition (parts) | Divinylbenzene (parts) |
| Hot-melt adhesive 1 | Crystalline material 1 | 14.0 | Crystalline material 6 | 2.0 | 0.5 |
| Hot-melt adhesive 2 | Crystalline material 1 | 14.0 | Crystalline material 6 | 2.0 | 0.5 |
| Hot-melt adhesive 3 | Crystalline material 2 | 14.0 | Crystalline material 6 | 2.0 | 0.5 |
| Hot-melt adhesive 4 | Crystalline material 1 | 14.0 | Crystalline material 6 | 2.0 | 0.5 |
| Hot-melt adhesive 5 | Crystalline material 1 | 14.0 | Crystalline material 6 | 2.0 | 0.5 |
| Hot-melt adhesive 6 | Crystalline material 1 | 14.0 | Crystalline material 6 | 2.0 | 0.5 |
| Hot-melt adhesive 7 | Crystalline material 3 | 14.0 | Crystalline material 6 | 2.0 | 0.5 |
| Hot-melt adhesive 8 | Crystalline material 1 | 14.0 | Crystalline material 6 | 2.0 | 0.1 |
| Hot-melt adhesive 9 | Crystalline material 1 | 14.0 | Crystalline material 6 | 2.0 | 0.3 |
| Hot-melt adhesive 10 | Crystalline material 1 | 14.0 | Crystalline material 6 | 2.0 | 0.7 |
| Hot-melt adhesive 11 | Crystalline material 1 | 14.0 | Crystalline material 6 | 2.0 | 0.9 |
| Hot-melt adhesive 12 | Crystalline material 1 | 14.0 | Crystalline material 7 | 2.0 | 0.5 |
| Hot-melt adhesive 13 | Crystalline material 1 | 14.0 | Crystalline material 8 | 2.0 | 0.5 |
| Hot-melt adhesive 14 | Crystalline material 1 | 14.0 | Crystalline material 9 | 2.0 | 0.5 |
| Hot-melt adhesive 15 | Crystalline material 1 | 14.0 | Crystalline material 2 | 2.0 | 0.5 |
| Hot-melt adhesive 16 | Crystalline material 4 | 14.0 | Crystalline material 6 | 2.0 | 0.5 |
| Hot-melt adhesive 17 | Crystalline material 4 | 14.0 | Crystalline material 6 | 2.0 | 0.5 |
| Hot-melt adhesive 18 | Crystalline material 2 | 14.0 | Crystalline material 6 | 2.0 | 0.5 |
| Hot-melt adhesive 19 | Crystalline material 2 | 14.0 | Crystalline material 6 | 2.0 | 0.5 |
| Hot-melt adhesive 20 | Crystalline material 5 | 14.0 | Crystalline material 6 | 2.0 | 0.5 |
| Hot-melt adhesive 21 | Crystalline material 4 | 14.0 | Crystalline material 6 | 2.0 | 0.5 |
| Hot-melt adhesive 22 | Crystalline material 3 | 14.0 | Crystalline material 6 | 2.0 | 0.5 |
| Hot-melt adhesive 23 | Crystalline material 1 | 14.0 | Crystalline material 6 | 2.0 | 0.3 |
| Hot-melt adhesive 24 | Crystalline material 1 | 14.0 | Crystalline material 6 | 2.0 | 0.7 |
| Hot-melt adhesive 25 | Crystalline material 1 | 14.0 | Crystalline material 6 | 2.0 | 0.7 |
| Comparative hot-melt adhesive 1 | Crystalline material 1 | 14.0 | Crystalline material 6 | 2.0 | 0.5 |
| Comparative hot-melt adhesive 2 | Crystalline material 3 | 14.0 | Crystalline material 6 | 1.0 | 0.5 |
| Comparative hot-melt adhesive 3 | Crystalline material 1 | 14.0 | Crystalline material 6 | 2.0 | 0.5 |
| Comparative hot-melt adhesive 4 | Crystalline material 1 | 14.0 | Crystalline material 6 | 2.0 | 0.5 |

TABLE 2-2

|  | Polymerization temperature (° C.) | Heat-treatment process | | Rapid cooling process | |
|---|---|---|---|---|---|
|  |  | Temperature (° C.) | Time (min) | Cooling temperature (° C.) | Cooling rate (° C./sec) |
| Hot-melt adhesive 1 | 70.0 | 100.0 | 60 | 40.0 | 4.0 |
| Hot-melt adhesive 2 | 70.0 | 100.0 | 30 | 40.0 | 1.0 |
| Hot-melt adhesive 3 | 70.0 | 100.0 | 240 | 40.0 | 9.0 |
| Hot-melt adhesive 4 | 75.0 | 100.0 | 60 | 40.0 | 4.0 |
| Hot-melt adhesive 5 | 65.0 | 100.0 | 60 | 40.0 | 4.0 |
| Hot-melt adhesive 6 | 60.0 | 100.0 | 60 | 40.0 | 4.0 |
| Hot-melt adhesive 7 | 70.0 | 100.0 | 60 | 40.0 | 4.5 |
| Hot-melt adhesive 8 | 70.0 | 100.0 | 60 | 40.0 | 4.0 |
| Hot-melt adhesive 9 | 70.0 | 100.0 | 60 | 40.0 | 4.0 |
| Hot-melt adhesive 10 | 70.0 | 100.0 | 60 | 40.0 | 4.0 |
| Hot-melt adhesive 11 | 70.0 | 100.0 | 60 | 40.0 | 4.0 |
| Hot-melt adhesive 12 | 70.0 | 100.0 | 60 | 40.0 | 4.0 |
| Hot-melt adhesive 13 | 70.0 | 100.0 | 60 | 40.0 | 4.0 |
| Hot-melt adhesive 14 | 70.0 | 100.0 | 60 | 40.0 | 4.0 |
| Hot-melt adhesive 15 | 70.0 | 100.0 | 60 | 40.0 | 4.0 |
| Hot-melt adhesive 16 | 70.0 | 100.0 | 60 | 40.0 | 5.0 |
| Hot-melt adhesive 17 | 70.0 | 90.0 | 60 | 40.0 | 4.0 |
| Hot-melt adhesive 18 | 70.0 | 100.0 | 60 | 40.0 | 6.0 |
| Hot-melt adhesive 19 | 70.0 | 100.0 | 60 | 40.0 | 5.0 |
| Hot-melt adhesive 20 | 70.0 | 100.0 | 60 | 40.0 | 4.0 |
| Hot-melt adhesive 21 | 70.0 | 100.0 | 60 | 40.0 | 4.0 |
| Hot-melt adhesive 22 | 70.0 | 100.0 | 60 | 40.0 | 4.0 |
| Hot-melt adhesive 23 | 75.0 | 100.0 | 60 | 40.0 | 4.0 |
| Hot-melt adhesive 24 | 62.0 | 100.0 | 60 | 40.0 | 4.0 |
| Hot-melt adhesive 25 | 60.0 | 100.0 | 60 | 40.0 | 4.0 |
| Comparative hot-melt adhesive 1 | 70.0 | 100.0 | 60 | 40.0 | 0.5 |

TABLE 2-2-continued

|  | Polymerization temperature (° C.) | Heat-treatment process | | Rapid cooling process | |
|---|---|---|---|---|---|
|  |  | Temperature (° C.) | Time (min) | Cooling temperature (° C.) | Cooling rate (° C./sec) |
| Comparative hot-melt adhesive 2 | 70.0 | 100.0 | 600 | 20.0 | 15.0 |
| Comparative hot-melt adhesive 3 | 80.0 | 100.0 | 60 | 40.0 | 4.0 |
| Comparative hot-melt adhesive 4 | 55.0 | 100.0 | 60 | 40.0 | 4.0 |

TABLE 3

| | Tm (° C.) | Tc (° C.) | Tm − Tc (° C.) | Mw × 10000 | Degree of compatibilization A of first crystalline material (%) | THF-insoluble matter (mass %) | Degree of compatibilization B of second crystalline material (%) | viscosity (Pa · s) at 100° C. × 10000 |
|---|---|---|---|---|---|---|---|---|
| Hot-melt adhesive 1 | 70 | 40 | 30 | 20 | 85 | 35 | 34 | 4.9 |
| Hot-melt adhesive 2 | 70 | 49 | 21 | 20 | 85 | 35 | 34 | 4.9 |
| Hot-melt adhesive 3 | 105 | 38 | 67 | 20 | 52 | 35 | 34 | 5.5 |
| Hot-melt adhesive 4 | 70 | 40 | 30 | 12 | 85 | 35 | 34 | 3.0 |
| Hot-melt adhesive 5 | 70 | 40 | 30 | 30 | 85 | 35 | 34 | 6.0 |
| Hot-melt adhesive 6 | 70 | 40 | 30 | 38 | 85 | 35 | 34 | 8.0 |
| Hot-melt adhesive 7 | 120 | 95 | 25 | 20 | 45 | 35 | 34 | 5.6 |
| Hot-melt adhesive 8 | 70 | 40 | 30 | 20 | 85 | 18 | 34 | 2.3 |
| Hot-melt adhesive 9 | 70 | 40 | 30 | 20 | 85 | 21 | 34 | 2.8 |
| Hot-melt adhesive 10 | 70 | 40 | 30 | 20 | 85 | 58 | 34 | 6.8 |
| Hot-melt adhesive 11 | 70 | 40 | 30 | 20 | 85 | 62 | 34 | 7.2 |
| Hot-melt adhesive 12 | 70 | 40 | 30 | 20 | 85 | 35 | 8 | 4.9 |
| Hot-melt adhesive 13 | 70 | 40 | 30 | 20 | 85 | 35 | 12 | 4.9 |
| Hot-melt adhesive 14 | 70 | 40 | 30 | 20 | 85 | 35 | 48 | 4.9 |
| Hot-melt adhesive 15 | 70 | 40 | 30 | 20 | 85 | 35 | 52 | 4.9 |
| Hot-melt adhesive 16 | 55 | 18 | 37 | 20 | 97 | 35 | 34 | 4.7 |
| Hot-melt adhesive 17 | 55 | 22 | 33 | 20 | 97 | 35 | 34 | 4.7 |
| Hot-melt adhesive 18 | 105 | 58 | 47 | 20 | 52 | 35 | 34 | 5.5 |
| Hot-melt adhesive 19 | 105 | 62 | 43 | 20 | 52 | 35 | 34 | 5.5 |
| Hot-melt adhesive 20 | 48 | 20 | 28 | 20 | 99 | 35 | 34 | 4.5 |
| Hot-melt adhesive 21 | 55 | 30 | 25 | 20 | 97 | 35 | 34 | 4.7 |
| Hot-melt adhesive 22 | 120 | 90 | 30 | 20 | 45 | 35 | 34 | 5.8 |
| Hot-melt adhesive 23 | 70 | 40 | 30 | 12 | 85 | 21 | 34 | 1.8 |
| Hot-melt adhesive 24 | 70 | 40 | 30 | 35 | 85 | 58 | 34 | 9.8 |
| Hot-melt adhesive 25 | 70 | 40 | 30 | 38 | 85 | 58 | 34 | 10.2 |
| Comparative Hot-melt adhesive 1 | 70 | 52 | 18 | 20 | 85 | 35 | 34 | 4.9 |
| Comparative Hot-melt adhesive 2 | 120 | 48 | 72 | 20 | 45 | 35 | 34 | 5.8 |
| Comparative Hot-melt adhesive 3 | 70 | 40 | 30 | 8 | 85 | 35 | 34 | 2.7 |
| Comparative Hot-melt adhesive 4 | 70 | 40 | 30 | 42 | 85 | 35 | 34 | 8.7 |

Example 1

Hot-melt adhesive 1 was evaluated using the following evaluation procedures. The evaluations were all performed in a normal-temperature, normal-humidity environment (25° C., 50% RH), and GFC-081 (81.0 g/m²) (Canon Marketing Japan Inc.) was used as the paper.
Evaluation of Adhesive Strength
Preparation of a Sample for Evaluation
A commercially available Canon laser beam printer LBP712Ci was used to prepare a sample for evaluation. By changing the software, the printer was modified so that it could work even if all the cartridges were not set. In addition, the laid-on level of hot-melt adhesive and the toner (mg/cm²) could be adjusted arbitrarily. The toner contained in the black cartridge of LBP712Ci was extracted, and the cartridge was filled with 150 g of hot-melt adhesive 1 and set in the black station.

Figure 8:
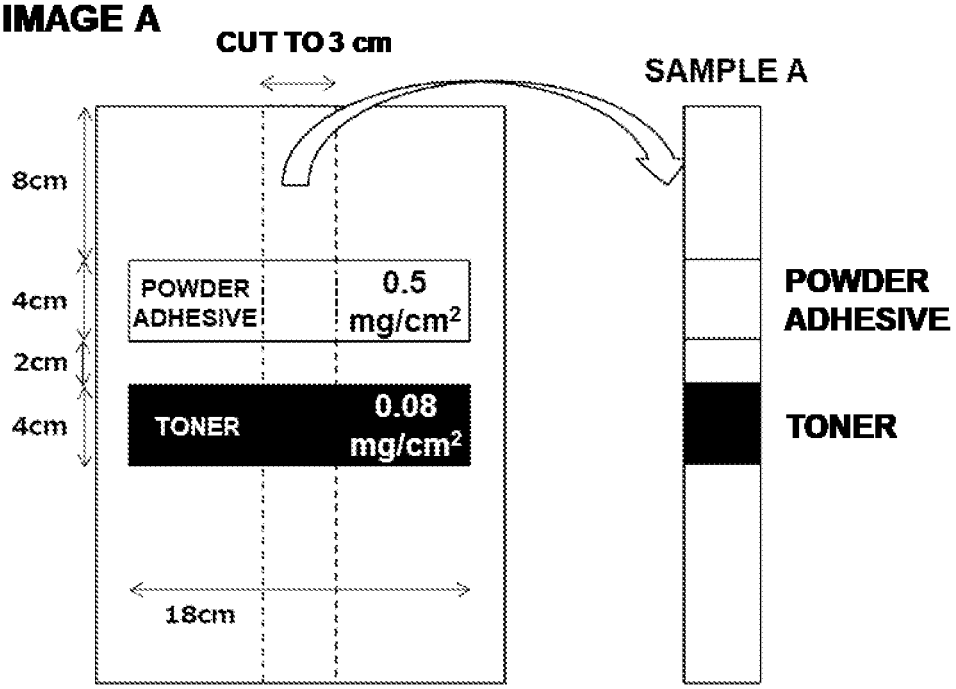
FIG. 8 is a schematic diagram of an evaluation sample.
Figure 8:
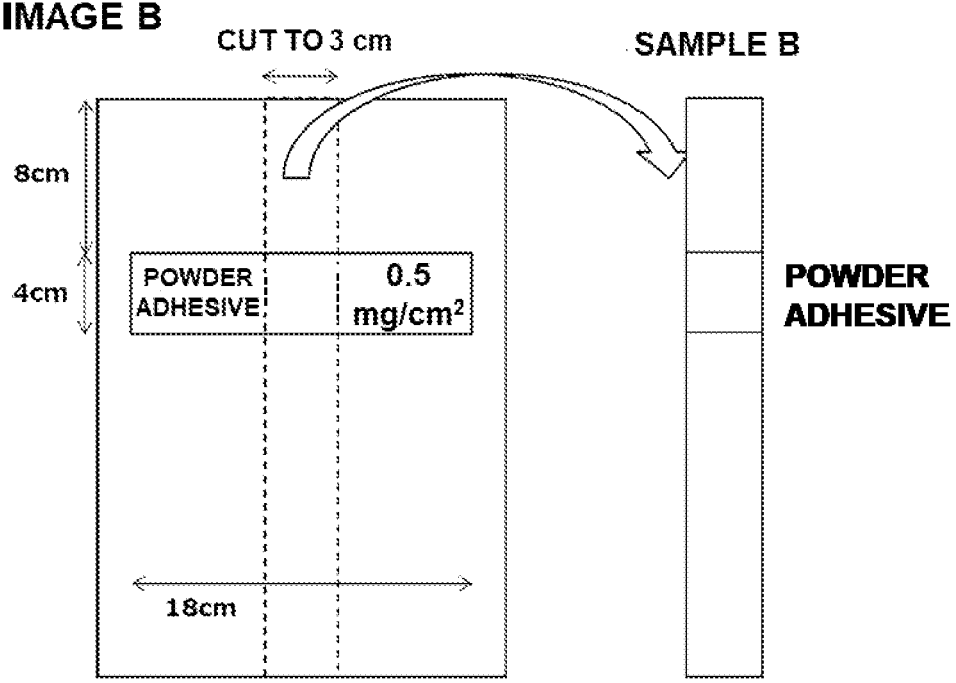

Using this printer, as illustrated in FIG. 8, the powder adhesive was printed at a laid-on level of 0.5 mg/cm² on a 4 cm area by opening a margin of 8 cm, and toner was further printed at a laid-on level of 0.08 mg/cm² on a 4 cm area by opening a margin of 2 cm (image A). Further, the powder adhesive was printed at a laid-on level of 0.5 mg/cm² on a 4 cm area by opening a front end margin of 8 cm on another paper (image B). The obtained image A was cut to a width of 3 cm to obtain sample A. Similarly, the image B was cut to obtain sample B. A standard toner of LBP712Ci was used as a toner.

Bonding of Evaluation Samples

Figure 9:
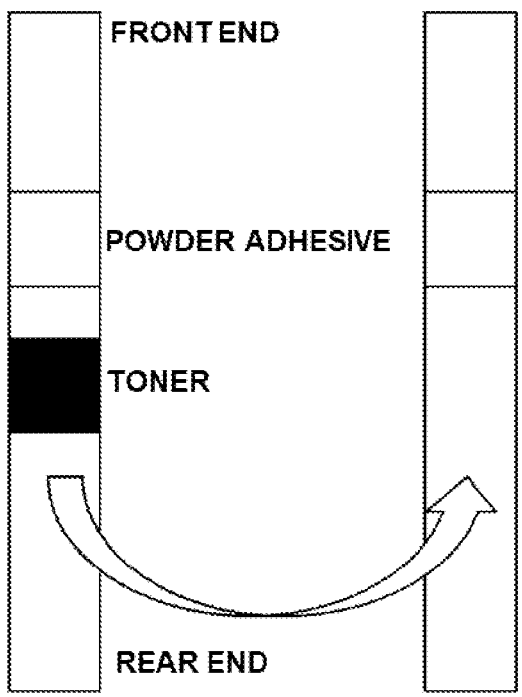
FIG. 9 is a schematic diagram of an evaluation sample.
Figure 9:
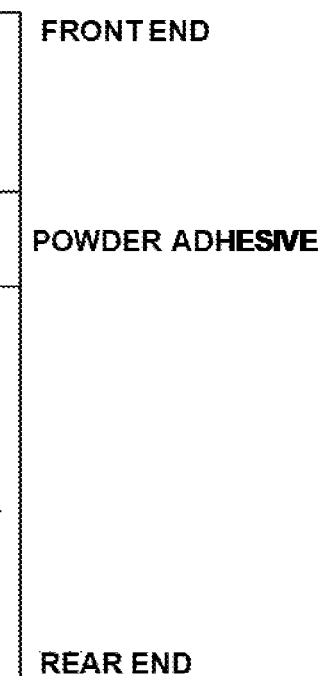
Figure 9:

As shown in FIG. 9, sample A and sample B were placed face-to-face with the image sides on the inside, the fixing unit temperature Tf of the external fixing unit removed from the LBP712Ci was adjusted to 200° C., and bonding was brought about by passage therethrough with the sample A side being the upper side.

Evaluation of Adhesive Strength and Bonding Rate

Figure 10:
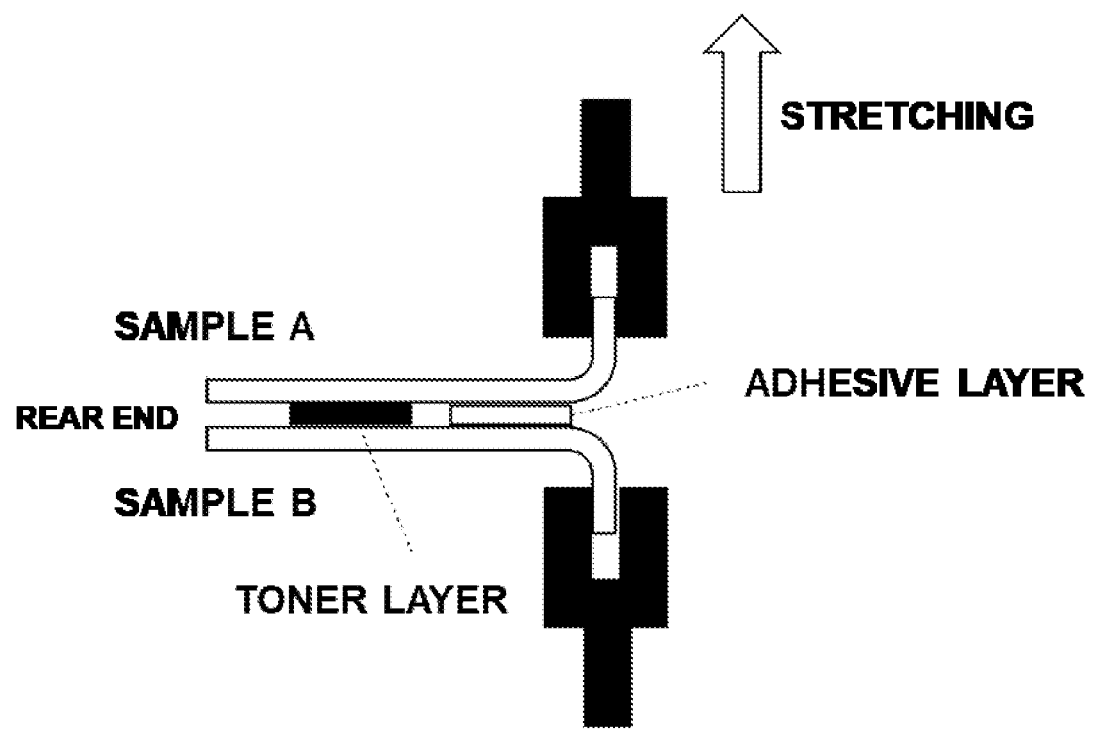
FIG. 10 is a schematic diagram of adhesive strength evaluation.

The adhesive strength of the glued-together bonded article was evaluated 10 seconds and 300 seconds after passage through the fixing unit. A Tencilon universal testing machine RTG-1225 (manufactured by A & D Co., Ltd.) was used to evaluate the adhesive strength. A parallel tightening type jaw was used as a jig, and the samples laminated as shown in FIG. 10 were set. A stress per 1 cm of width, which was obtained by multiplying the maximum value in a graph which was obtained when the evaluation sample was peeled off under the condition of 50 mm/min and in which the distance (mm) was plotted against the abscissa and the stress (N/cm$^2$) was plotted against the ordinate by ⅓, was defined as the adhesive strength (N/cm$^2$). The larger this value, the better the adhesive strength.

Examples 2 to 29 and Comparative Examples 1 to 4

Evaluations were carried out in Examples 2 to 29 and Comparative Examples 1 to 4 proceeding as in Example 1, but changing the hot-melt adhesive and Tf as shown in Table 4. The results of the evaluations are given in Table 4.

TABLE 4

| Example No. | | Tf (° C.) | Tm (° C.) | Adhesive strength, Tf − stress (N/cm$^2$) | |
|---|---|---|---|---|---|
| | | | | After 10 seconds | After 300 seconds |
| 1 | Hot-melt adhesive 1 | 200 | 130 | 1.5 | 2.0 |
| 2 | Hot-melt adhesive 2 | 200 | 130 | 0.8 | 0.8 |
| 3 | Hot-melt adhesive 3 | 235 | 130 | 0.5 | 2.0 |
| 4 | Hot-melt adhesive 4 | 200 | 130 | 0.8 | 1.0 |
| 5 | Hot-melt adhesive 5 | 200 | 130 | 1.5 | 2.0 |
| 6 | Hot-melt adhesive 6 | 200 | 130 | 0.8 | 1.0 |
| 7 | Hot-melt adhesive 7 | 250 | 130 | 0.9 | 0.9 |
| 8 | Hot-melt adhesive 8 | 200 | 130 | 0.7 | 0.9 |
| 9 | Hot-melt adhesive 9 | 200 | 130 | 1.0 | 1.3 |
| 10 | Hot-melt adhesive 10 | 200 | 130 | 1.0 | 1.3 |
| 11 | Hot-melt adhesive 11 | 200 | 130 | 0.7 | 0.9 |
| 12 | Hot-melt adhesive 12 | 200 | 130 | 0.7 | 0.9 |
| 13 | Hot-melt adhesive 13 | 200 | 130 | 1.1 | 1.5 |
| 14 | Hot-melt adhesive 14 | 200 | 130 | 1.1 | 1.5 |
| 15 | Hot-melt adhesive 15 | 200 | 130 | 0.7 | 0.9 |
| 16 | Hot-melt adhesive 16 | 185 | 130 | 0.5 | 1.2 |
| 17 | Hot-melt adhesive 17 | 185 | 130 | 0.7 | 1.5 |
| 18 | Hot-melt adhesive 18 | 235 | 130 | 1.8 | 2.0 |
| 19 | Hot-melt adhesive 19 | 235 | 130 | 1.8 | 2.0 |
| 20 | Hot-melt adhesive 20 | 178 | 130 | 0.5 | 0.6 |
| 21 | Hot-melt adhesive 21 | 185 | 130 | 0.8 | 1.0 |
| 22 | Hot-melt adhesive 22 | 250 | 130 | 0.9 | 0.9 |
| 23 | Hot-melt adhesive 23 | 200 | 130 | 0.6 | 0.6 |
| 24 | Hot-melt adhesive 24 | 200 | 130 | 1.0 | 1.0 |
| 25 | Hot-melt adhesive 25 | 200 | 130 | 0.6 | 0.6 |
| 26 | Hot-melt adhesive 1 | 130 | 60 | 0.6 | 0.8 |
| 27 | Hot-melt adhesive 1 | 150 | 80 | 1.0 | 1.3 |
| 28 | Hot-melt adhesive 1 | 260 | 190 | 1.0 | 1.3 |
| 29 | Hot-melt adhesive 1 | 280 | 210 | 0.6 | 0.8 |
| Comparative 1 | Comparative hot-melt adhesive 1 | 200 | 130 | 0.3 | 0.3 |
| Comparative 2 | Comparative hot-melt adhesive 2 | 250 | 130 | 0.3 | 2.0 |
| Comparative 3 | Comparative hot-melt adhesive 3 | 200 | 130 | 0.3 | 0.3 |
| Comparative 4 | Comparative hot-melt adhesive 4 | 200 | 130 | 0.3 | 0.3 |

As is clear from Table 4, the present invention can provide an adhesive that can rapidly develop a high adhesive strength and can provide a method for producing the corresponding bonded articles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-035177, filed Mar. 5, 2021 which is hereby incorporated by reference herein in its entirety.

What is claimed is:

1. A hot-melt adhesive, comprising:
a thermoplastic resin; and
a first crystalline material, wherein
Tc is 20 to 60° C., Tm is 50 to 110° C. and Tm−Tc is 20.0 to 70.0° C.
when in differential scanning calorimetric measurement of the hot-melt adhesive, Tc (° C.) is a peak temperature of the highest peak of exothermic peaks observed in a temperature reduction process at 10° C./min following heating to 150° C. and Tm (° C.) is a peak temperature of the highest peak of endothermic peaks observed in a temperature increasing process at 10° C./min following the temperature reduction process, and
a tetrahydrofuran-soluble matter of the hot-melt adhesive has a weight-average molecular weight Mw of 100,000 to 400,000 as measured by gel permeation chromatography.

2. The hot-melt adhesive according to claim 1, wherein a degree of compatibilization A (%) given by 100−(100×ΔH(A))/(ΔH(C)×C/100) is 50 to 100%,
when ΔH(A) represents an exothermic value (J/g) of exothermic peaks for a mixed resin A of the thermoplastic resin of 88.1 mass % and the first crystalline material of 11.9 mass % according to differential scanning calorimetric measurement,
ΔH(C) represents an exothermic value (J/g) of exothermic peaks of the first crystalline material according to differential scanning calorimetric measurement, and
C is 11.9.

3. The hot-melt adhesive according to claim 1, wherein a content of tetrahydrofuran-insoluble matter in the hot-melt adhesive that is not extracted by Soxhlet extraction of the hot-melt adhesive for 16 hours using tetrahydrofuran is 20 to 60 mass %.

4. The hot-melt adhesive according to claim 1, comprising a second crystalline material, wherein
a degree of compatibilization B (%) given by 100−(100×ΔH(B))/(ΔH(C2)×D/100) is 10 to 50%,
when ΔH(B) represents an exothermic value (J/g) of exothermic peaks for a mixed resin B of the thermoplastic resin of 98.1 mass % and the second crystalline material of 1.9 mass % according to differential scanning calorimetric measurement, ΔH(C2) represents an exothermic value (J/g) of exothermic peaks of the second crystalline material according to differential scanning calorimetric measurement, and D is 1.9.

5. The hot-melt adhesive according to claim 1, wherein a viscosity of the hot-melt adhesive at 100° C. is 20,000 to 100,000 Pa·s as measured with a capillary rheometer operating on a constant load extrusion principle.

6. The hot-melt adhesive according to claim 1, wherein the first crystalline material is an ester wax.

7. The hot-melt adhesive according to claim 1, wherein the thermoplastic resin is an amorphous resin.

8. A method for producing a bonded article, comprising the steps of:
   forming a bonding region on a sheet of paper using the hot-melt adhesive according to claim 1;
   fixing the bonding region by heating with a fixing unit;
   overlaying the paper so as to sandwich the formed bonding region; and
   bonding the overlaid paper by heating and melting the bonding region, wherein
   $70 \leq Tf-Tm \leq 200$ where Tf (° C.) is the temperature of the fixing unit during the heating and Tm (° C.) is a melting point of the hot-melt adhesive.

* * * * *